(12) United States Patent
Garden et al.

(10) Patent No.: US 10,937,328 B2
(45) Date of Patent: Mar. 2, 2021

(54) AIRCRAFT FLIGHT INFORMATION SYSTEM AND METHOD

(71) Applicant: THE BOEING COMPANY, Chicago, IL (US)

(72) Inventors: Grace Shanti Garden, Brisbane (AU); Sarah Anne Mecklem, Brisbane (AU); Reece A. Clothier, Melbourne (AU); Brendan Patrick Williams, Brisbane (AU); Neale Leslie Fulton, Canberra (AU)

(73) Assignee: THE BOEING COMPANY, Chicago, IL (US)

( * ) Notice: Subject to any disclaimer, the term of this patent is extended or adjusted under 35 U.S.C. 154(b) by 163 days.

(21) Appl. No.: 16/152,250

(22) Filed: Oct. 4, 2018

(65) Prior Publication Data

US 2020/0111375 A1 Apr. 9, 2020

(51) Int. Cl.
  *G08G 5/04* (2006.01)
  *G08G 5/00* (2006.01)
  *G05D 1/00* (2006.01)

(52) U.S. Cl.
  CPC .......... *G08G 5/045* (2013.01); *G08G 5/0013* (2013.01); *G08G 5/0017* (2013.01); *G05D 1/0016* (2013.01); *G05D 1/0044* (2013.01)

(58) Field of Classification Search
  None
  See application file for complete search history.

(56) References Cited

U.S. PATENT DOCUMENTS

| | | | | |
|---|---|---|---|---|
| 2,529,601 A | * | 11/1950 | Freehafer | G06G 3/00 235/61 NV |
| 3,371,887 A | * | 3/1968 | Welti | F41G 7/30 244/3.11 |
| 3,434,141 A | * | 3/1969 | Welti | G08G 5/0078 342/29 |
| 3,534,367 A | * | 10/1970 | Laughlin | G01S 11/10 342/456 |

(Continued)

FOREIGN PATENT DOCUMENTS

| | | |
|---|---|---|
| EP | 2196974 A1 | 6/2010 |
| EP | 3089115 A1 | 11/2016 |
| GB | 2492665 A | 1/2013 |

OTHER PUBLICATIONS

Darrah, Sara, "Air Force's C-ABSAA Program, Automation Lessons Learned," U.S. Air Force, Sep. 20, 2017, 37 pgs.

(Continued)

*Primary Examiner* — Shelley Chen
(74) *Attorney, Agent, or Firm* — Moore IP Law

(57) ABSTRACT

A method includes determining data indicating velocity uncertainty, relative position uncertainty, or both, associated with an aircraft and a navigation hazard. The method also includes determining a set of bounding vectors based on the data and determining a plurality of candidate intersection points that together correspond to circular or spherical regions defined by the set of bounding vectors. The method also includes identifying a region of interest based on a projected intersection of the aircraft or the navigation hazard with a candidate intersection point and generating a situational awareness display based on the region of interest.

22 Claims, 19 Drawing Sheets

(56) References Cited

U.S. PATENT DOCUMENTS

| | | | | |
|---|---|---|---|---|
| 5,173,861 | A | * 12/1992 | Inselberg | G08G 5/0052 701/301 |
| 5,732,697 | A | 3/1998 | Zhang et al. | |
| 6,546,338 | B2 | * 4/2003 | Sainthuile | G08G 5/045 701/301 |
| 7,706,979 | B1 | 4/2010 | Herwitz | |
| 8,406,465 | B1 | * 3/2013 | Garrett | G06K 9/20 382/103 |
| 9,311,539 | B1 | * 4/2016 | Garrett | G06K 9/0063 |
| 10,139,474 | B2 | 11/2018 | Gurusamy et al. | |
| 2002/0032528 | A1 | * 3/2002 | Lai | G08G 5/0008 701/301 |
| 2002/0133294 | A1 | 9/2002 | Farmakis et al. | |
| 2002/0152029 | A1 | * 10/2002 | Sainthuile | G08G 5/045 701/301 |
| 2003/0014165 | A1 | * 1/2003 | Baker | G05D 1/104 701/3 |
| 2007/0222665 | A1 | 9/2007 | Koeneman | |
| 2009/0259402 | A1 | * 10/2009 | Gates | G08G 3/02 701/301 |
| 2010/0256909 | A1 | * 10/2010 | Duggan | G08G 5/0069 701/301 |
| 2011/0118981 | A1 | * 5/2011 | Chamlou | G08G 5/045 701/301 |
| 2011/0160950 | A1 | * 6/2011 | Naderhirn | G05D 1/0202 701/28 |
| 2012/0150367 | A1 | 6/2012 | Potagnik et al. | |
| 2012/0303252 | A1 | * 11/2012 | Schwinn | G08G 5/045 701/120 |
| 2013/0179009 | A1 | 7/2013 | Gershzohn | |
| 2014/0257602 | A1 | 9/2014 | Gaston | |
| 2015/0154874 | A1 | 6/2015 | Murthy et al. | |
| 2015/0364044 | A1 | 12/2015 | Kashi et al. | |
| 2016/0071422 | A1 | 3/2016 | Bazawada et al. | |
| 2018/0090018 | A1 | 3/2018 | Gavrilets et al. | |
| 2019/0304314 | A1 | * 10/2019 | Hochwarth | G08G 5/0008 |
| 2019/0371183 | A1 | 12/2019 | Mecklem et al. | |
| 2020/0111375 | A1 | 4/2020 | Garden et al. | |
| 2020/0202732 | A1 | 6/2020 | Mecklem et al. | |

OTHER PUBLICATIONS

Edwards, Gerald D., et al., "Visual Aspects of Air Collision Avoidance: Computer Studies on Pilot Warning Indicator Specifications—Final Report," NASA-Ames Research Center, Grant No. NG-05-009-059, pp. 1-29.

Extended European Search Report for Application No. 19183220.3 dated Mar. 5, 2020, 6 pgs.

Fulton, Neale L. et al., "Aircraft Proximiy: a synthesis of Appollonius, X-track, and Well Clear Vollume pardigms," 2018 IEEE/AIAA 37th Digital Avionics Systems Conference (DASC), London, 2018, pp. 1-10, doi: 10.1109/DASC.2018.8569870.

Fulton, Neale L. et al., "The Apollonian paradigm in Cockpit and Ground-based Pilot Display Design," 2019 IEEE/AIAA 38th Digital Avionics Systems Conference (DASC), San Diego, CA, USA, 2019, pp. 1-10, doi: 10.1109/DASC43569.2019.9081694.

INEXA Control, Par of INEXA solutions, https://www.insitu.com/inexa-control, retrieved Sep. 2, 2020, 4 pgs.

Randle, Jr., Robert J., "Visual Field Narrowing by Non Visual Factors," Flying Safety, Jul. 1982, pp. 14-18.

RTCA, Inc., Minimum Operational Performance Standards (MOPS) for Detect and Avoid (DAA) Systems, RTCA Paper No. 261-15/PMC-1400, Dec. 9, 2016, 775 pgs.

Shively, J., "NASA UAS Integration Into the NAS Project Detect and Avoid Display Evaluations," Air Force—NASA Bi-Annual Research Council Meeting, Oct. 12, 2016, 10 pgs.

U.S. Department of Transportation, Federal Aviation Administration, "Introduction to TCAS II, Version 7.1," Feb. 28, 2011, pp. 1-50.

Fulton, N.L., and Huynh, U. 2015. Conflict Management: Apollonius in Airspace Design, Safety Science, vol. 72, pp. 9-22, Feb. 2015.

Garden, Grace et al. "A Novel Approach to the Generation of Aircraft Collision Avoidance Advisories," 2019 IEEE/AIAA 38th Digital Avionics Systems Conference Sep. 2019, DOI: 10.1109/DASC43569.2019.9081694, pp. 1-12.

Munoz, C. et al. "DAIDALUS: Detect and Avoid Alerting Logic for Unmanned Systems," In Proc. 34th Digital Avionics Systems Conference, Prague, Czech Republic, Sep. 13-17, 2015, pp. 1-18.

Munoz, Cesar A. et al., "A Family of Well-Clear Boundary Models for the Integration of UAS with the NAS," AIAA Aviation Forum, Jun. 16-20, 2014, Atlanta Georgia, 14th AIAA Aviation Technology, Integration, and Operations Conference, American Institute of Aeronautics and Astronautics, DOI: 10.2514/6.2014-2412, pp. 1-16.

RTCA, Inc., Minimum Operational Performance Standards (MOPS) for Detect and Avoid (DAA) Systems, RTCA Paper No. 261-15/_MC-1400, Version 3.9, Dec. 9, 2016, pp. 1-775.

Wadley, Jason E. et al., "Development of an Automatic Aircraft Collision Avoidance System for Fighter Aircraft," Guidance, Navigation, and Control and Co-located Conferences, Aug. 19-22, 2013, Boston MA, American Institute of Aeronautics and Astronautics, pp. 1-12.

Extended European Search Report for Application No. 19191085.0, dated Dec. 19, 2019, 7 pgs.

* cited by examiner

Velocity vector →
Relative position vector ↔

AIRCRAFT FLIGHT INFORMATION SYSTEM AND METHOD

FIELD OF THE DISCLOSURE

The present disclosure is generally related to an aircraft flight information system.

BACKGROUND

For automatically piloted aircraft, Detect and Avoid (DAA) systems use information descriptive of an airspace to make automated maneuvering decisions. For manned aircraft, DAA systems can greatly improve pilot situational awareness by providing the pilot with relevant data about the airspace. DAA systems can be used in conventional manned aircraft and remotely piloted aircraft, since in both situations the pilot can have limited access to the relevant airspace information.

The "detect" aspect of DAA system operation refers to evaluating an aircraft's flight path and surroundings to determine whether the aircraft will encounter a navigation hazard (e.g., another aircraft, terrain, etc.) along the flight path. The DAA system can also evaluate potential flight paths of the aircraft to determine, for example, whether certain changes in the flight path could cause the aircraft to encounter a navigation hazard. The evaluation of the aircraft's flight path along with other relevant data, such as flight paths of other aircraft in an airspace, to detect possible encounters with navigation hazards is a dynamic process that changes in real-time as circumstances in the airspace change, and can use significant processing resources and time. Because circumstances in the airspace change continuously, it is desirable for the DAA system to give a pilot or flight control system as much advance notice as possible that the aircraft could encounter a navigation hazard under particular circumstances.

SUMMARY

In a particular implementation, a method includes obtaining, at a processor, first position data and first velocity data associated with an aircraft, second position data and second velocity data associated with a navigation hazard, and position uncertainty data. The method also includes determining, at the processor based on the position uncertainty data, relative position uncertainty data indicating relative position uncertainty associated with the aircraft and the navigation hazard. The method further includes determining, at the processor, a set of bounding relative position vectors. Each relative position vector of the set of bounding relative position vectors indicates a possible direction between the aircraft and the navigation hazard based on the first position data, the second position data, and the relative position uncertainty data. Each relative position vector of the set of bounding relative position vectors further indicates a possible distance between the aircraft and the navigation hazard based on the first position data, the second position data, and the relative position uncertainty data. The method also includes determining, at the processor, a plurality of candidate intersection points that together correspond to circular or spherical regions defined by the set of bounding relative position vectors and one or more speed ratios based on the first velocity data and the second velocity data. The method also includes identifying a region of interest based on a projected intersection of the aircraft with a candidate intersection point of the plurality of candidate intersection points or a projected intersection of the navigation hazard with the candidate intersection point. The method also includes generating a situational awareness display based on the region of interest.

In another particular implementation, a method includes obtaining, at a processor, first position data and first velocity data associated with an aircraft and obtaining, at the processor, second position data and second velocity data associated with a navigation hazard. The method also includes obtaining, at the processor, velocity uncertainty data indicating uncertainty associated with the first velocity data, uncertainty associated with the second velocity data, or both. The method further includes determining, at the processor, a relative position vector based on the first position data and the second position data, where the relative position vector indicates a direction and distance between the aircraft and the navigation hazard. The method also includes determining, at the processor, a plurality of candidate intersection points that together correspond to circular or spherical regions defined by the relative position vector and a set of speed ratios based on the first velocity data, the second velocity data, and the velocity uncertainty data. The method further includes identifying a region of interest based on a projected intersection of the aircraft with a candidate intersection point of the plurality of candidate intersection points or a projected intersection of the navigation hazard with the candidate intersection point and generating a situational awareness display based on the region of interest.

In another particular implementation, a method includes obtaining, at a processor, first position data and first velocity data associated with an aircraft, second position data and second velocity data associated with a navigation hazard, and position uncertainty data. The method also includes obtaining, at the processor, velocity uncertainty data indicating uncertainty associated with the first velocity data, uncertainty associated with the second velocity data, or both. The method further includes determining, at the processor based on the position uncertainty data, relative position uncertainty data indicating relative position uncertainty associated with the aircraft and the navigation hazard. The method also includes determining, at the processor, a set of bounding relative position vectors. Each relative position vector of the set of bounding relative position vectors indicates a possible direction between the aircraft and the navigation hazard based on the first position data, the second position data, and the relative position uncertainty data. Each relative position vector of the set of bounding relative position vectors also indicates a possible distance between the aircraft and the navigation hazard based on the first position data, the second position data, and the relative position uncertainty data. The method further includes determining, at the processor based on the first velocity data, the second velocity data, and the velocity uncertainty data, one or more bounding first velocity vectors and one or more bounding second velocity vectors. The method also includes determining, at the processor, a plurality of candidate intersection points that together correspond to circular or spherical regions defined by the set of bounding relative position vectors and one or more speed ratios based on the one or more bounding first velocity vectors and the one or more bounding second velocity vectors. The method further includes identifying a region of interest based on a projected intersection of the aircraft or the navigation hazard with a candidate intersection point of the plurality of candidate intersection points and generating a situational awareness display based on the region of interest.

DETAILED DESCRIPTION

Figure 1:
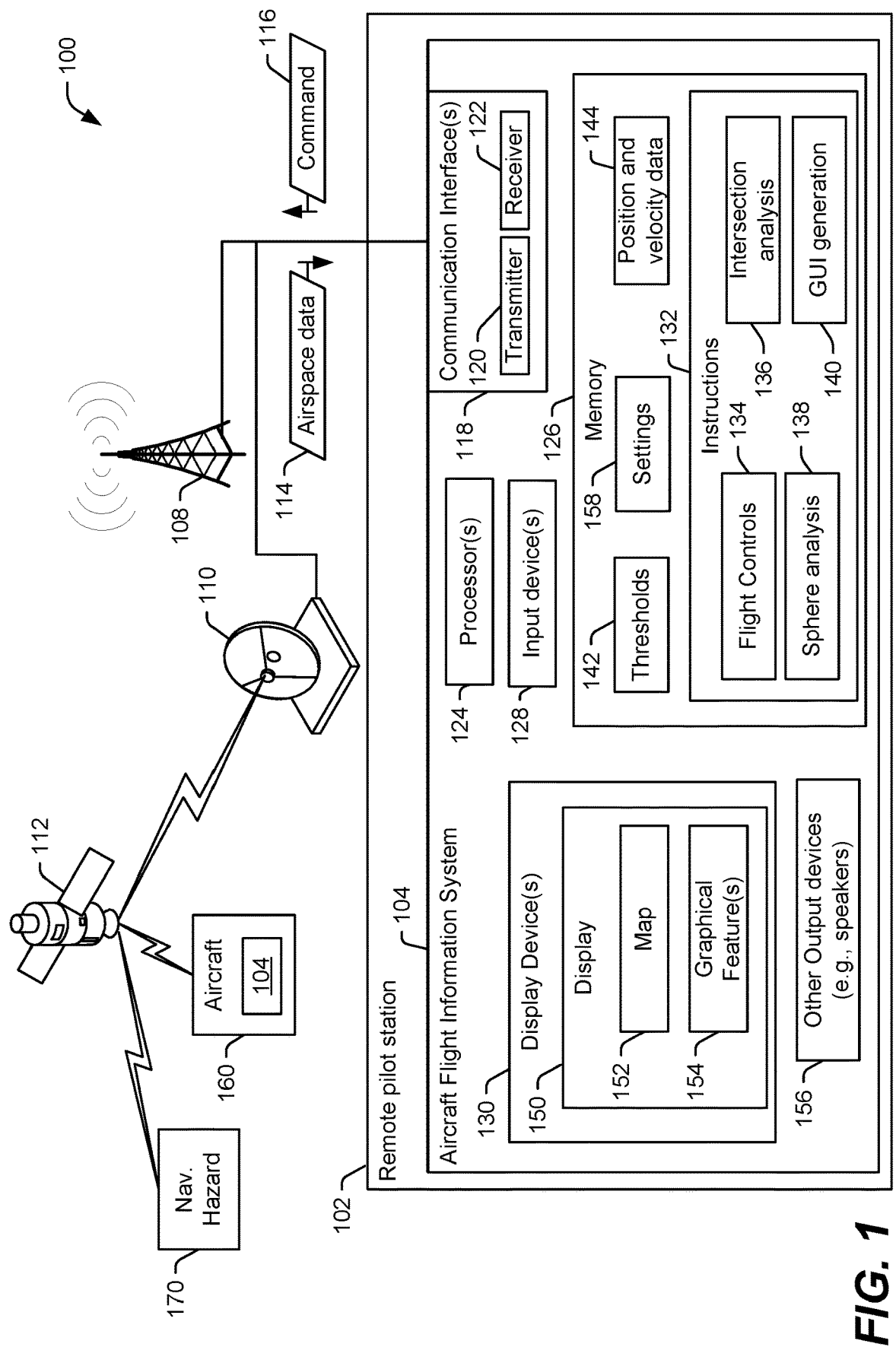
FIG. 1 is a block diagram that illustrates an example of a system that includes an aircraft flight information system.

Implementations disclosed herein provide human machine interfaces that improve pilot situational awareness. Particular implementations are described herein with reference to the drawings. In the description, common features are designated by common reference numbers throughout the drawings.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the terms "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. Additionally, "adjusting" and "modifying" can be used interchangeably. For example, "adjusting" or "modifying" a parameter can refer to changing the parameter from a first value to a second value (a "modified value" or an "adjusted value"). As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Implementations disclosed herein include elements of a DAA system or more generally of an aircraft flight information system. In particular, the aircraft flight information system is configured to generate a situational awareness display including warning information and guidance information to pilots. The disclosure also includes methods of determining the information to be displayed, and in particular, methods of determining a region of interest in which an aircraft may encounter a navigation hazard. In this context, encountering a navigation hazard refers to the aircraft and the navigation hazard being separated by less than a threshold distance. The condition of aircraft and the navigation hazard being separated by less than a threshold distance is also referred to as a "loss of separation" between the aircraft and the navigation hazard.

In a particular implementation, the aircraft flight information system generates a situational awareness display that provides a pilot (which may be a remote pilot) with information about a region of interest (e.g., a location at which a loss of separation may occur). For example, the display may overlay a graphical feature on a map display to identify or indicate the region of interest. In some implementations, the display also provides the pilot with information indicating the location, identification, and other relevant information (e.g., estimated or projected flight path) related to aircraft in an airspace. The display can be supplemented with audible cues, such as verbal notifications or tones. The display can also provide the pilot with information about the aircraft being piloted, such as headings, altitudes/vertical profiles, and locations of waypoints. In some implementations, the display is constructed to reduce pilot workload by displaying a consistent set of information that is readily understandable to the pilot. For example, the aircraft flight information system can avoid generating the display in a manner that switches between providing advice on where to avoid directing the aircraft (e.g., "no-go" advice) and where to direct the aircraft ("go" advice). Switching between go advice and no-go advice can lead to pilot confusion and increase pilot workload since the pilot has to evaluate each piece of information presented in the display in a timely manner to decide whether the information is go advice or no-go advice.

As used herein, a region of interest is determined based on proximity of a possible flight path of the aircraft and a location and/or projected path of the navigation hazard. The region of interest can correspond to a point of closest approach or a point of possible intersection. In this context, proximity can be based on measurements of distance, measurements of time, or both, unless context indicates otherwise. For example, the proximity of two aircraft can be expressed as a distance (e.g., a number of meters or feet) based on positions of the aircraft or can be expressed as time (e.g., a number of seconds) based on the positions of the aircraft and the relative velocity between the aircraft. Additionally, as used herein, a separation violation condition can occur based on the proximity of the aircraft being less than a time-based separation threshold, less than a distance-based separation threshold, or both. For example, a time-based separation threshold can be compared to a distance-based proximity by converting the time-based separation threshold to a distance using the relative velocity between the aircraft, or by converting the distance-based proximity to a time using the relative velocity between the aircraft.

In a particular implementation, the aircraft flight information system can identify regions of interest quickly and efficiently (in terms of computing resources) even when there is uncertainty in the position of the aircraft, the position of the navigation hazard, the velocity of the aircraft, the velocity of the navigation hazard, or a combination thereof.

The aircraft flight information system accounts for position and/or velocity uncertainty by using a simplified approach (as compared to brute force approaches described further below) based on bounding vectors. The position and/or velocity uncertainty can include or correspond to an estimate of error associated with each sensor or sensor reading, a correction value for outside or transitory forces or conditions (e.g., a gust of wind, a high temperature area, a low temperature area, a high pressure area, a low pressure area), or a combination thereof. The bounding vectors are used to determine a set of Apollonius circles or Apollonius spheres, where each Apollonius circle or Apollonius sphere is determined based on a speed ratio (e.g., a ratio of the magnitudes of velocity vectors) of the aircraft and the navigation hazard, and relative positions (e.g., a relative position vector) of the aircraft and the navigation hazard. Determination of the Apollonius circles or Apollonius spheres is a geometric calculation, but the calculation does not account for directionality of the velocity vectors of the aircraft and/or navigation hazard. Thus, the Apollonius circles or Apollonius spheres are defined as a plurality of candidate intersection points, which corresponds to possible intersection points of the aircraft and the navigation hazard, irrespective of the directions of the velocity vectors. A region of interest (or regions of interest) is identified by projecting a line along the direction of a velocity vector (of the aircraft or the navigation hazard) to locate a point of closest approach of an intersection of the line with an Apollonius circle or Apollonius sphere. The bounding vectors are selected to provide the set of Apollonius circles or Apollonius spheres with the most useful information to generate the regions of interest. In some circumstances, the bounding vectors can also be selected to simplify generation of a coarse estimate of a point of closest approach or point of intersection, which can subsequently be fine-tuned using additional bounding vectors or other calculations.

The use of bounding vectors to determine regions of interest taking into account position and/or velocity uncertainty, as described herein, is more efficient (in terms of computing resources required) and faster than other methods that have been used to determine regions of interest while taking into account position and/or velocity uncertainty. For example, many DAA systems are simply not capable of performing real-time calculations of regions of interest (e.g., points of closest approach or intersection) in a manner that accounts for position and velocity uncertainty. An example of a system that does perform calculations that account for position and velocity uncertainty is the Detect and Avoid Alerting Logic for Unmanned Systems (DAIDALUS) tool developed by the U.S. National Aeronautics and Space Administration (NASA). The DAIDALUS tool uses a set of parameter values that are determined by off-line simulation, and generates a region of interest from the parameters via brute-force simulation. As a direct consequence of the offline approach to managing uncertainty, the DAIDALUS tool's estimation technique is only valid for the aircraft and encounter conditions simulated. That is, the DAIDALUS tool is unable to account for dynamic and actual uncertainties associated with a specific real-world mid-air encounter that evolves in real-time. To compensates for this concern, the DAIDALUS tool uses conservative parameters values, which can lead to higher false alarm rates, and in turn, unnecessary maneuvering of the aircraft. The bounding vector approach described herein can account for actual, real-world airspace encounter conditions, and can do so without using the significant computing resources required for brute force simulation, without using offline simulation, and without using unnecessarily conservative parameters. As a result, pilots (or flight control systems) are provided with more accurate and more timely situational awareness data.

FIG. 1 is a block diagram that illustrates an example of a system 100 that includes an aircraft flight information system 104. The aircraft flight information system 104 is configured to facilitate operation of an aircraft 160 that is controlled via the aircraft flight information system 104. The aircraft flight information system 104 is configured to provide a display 150 that includes information descriptive of an airspace near the aircraft 160. For example, the airspace can include a navigation hazard 170, which may be another aircraft, terrain, a structure, etc. The aircraft flight information system 104 is also configured to send commands 116 to the aircraft 160 based on pilot and/or autopilot flight control inputs. In FIG. 1, the aircraft flight information system 104 is a component of or integrated within a remote pilot station 102 to enable remote piloting of the aircraft 160, or is a component of or integrated within the aircraft 160 or within another aircraft.

The aircraft flight information system 104 includes at least one processor 124, a memory 126, one or more input devices 128, one or more communication interfaces 118, a display device 130, and other output devices 156 (e.g., speakers, buzzers, lights, etc.). The memory 126, the input device(s) 128, the communication interface 118, the display device 130, and other output devices 156 are directly or indirectly coupled to the processor(s) 124. The memory 126 stores instructions 132 that are executable by the processor (s) 124 to perform various operations associated with receiving and presenting information descriptive of an airspace around the aircraft 160, presenting flight advice to a pilot, receiving and processing flight control input from the pilot, and communicating commands to the aircraft 160.

The communication interface 118 includes or is coupled to a transmitter 120, a receiver 122, or a combination thereof (e.g., a transceiver). The communication interface 118 is configured to enable communication with the aircraft 160, another aircraft, systems that gather or generate airspace data 114 descriptive of the airspace around the aircraft 160, or a combination thereof. The communication can include sending and/or receiving information generated at the aircraft 160 (e.g., audio, video, or sensor data), information generated at other aircraft (e.g., voice or transponder information), information generated at or collected by the aircraft flight information system 104 (e.g., commands), or a combination thereof. For example, the communication interface 118 is configured to receive commands from the processor (s) 124 and to cause the transmitter 120 to send the commands, such as a command 116, to the aircraft 160. In FIG. 1, the command 116 is sent via a wireless transmission, such as via a terrestrial radiofrequency antenna 108 or via a satellite uplink between a satellite ground station antenna 110 and one or more satellites 112. In implementations in which the aircraft flight information system 104 is integrated within the aircraft 160, the command 116 can be transmitted via a bus or on-board data communication architecture of the aircraft 160.

The receiver 122 is configured to receive the airspace data 114 and/or other information via the terrestrial radiofrequency antenna 108, via the satellite uplink, via another source (such as a radar system or an air traffic control system), or a combination thereof. The airspace data 114 includes information such as the position, velocity, altitude, and type of the aircraft 160 and of the navigation hazard 170. The airspace data 114 can also include other information, such as notices to airmen, terrain and weather information. The airspace data 114 is provided to the processor(s) 124, stored in the memory 126, or both. For example, at least a portion of the airspace data 114 can be stored as position and velocity data 144.

The position and velocity data 144 is generated based on measurements from sensors on-board the aircraft 160, sensors on-board the navigation hazard 170, sensors on-board other aircraft or space-craft, ground-based sensors, or a combination thereof. The position and velocity data 144 can also include uncertainty data indicating an estimate of error associated with each sensor or sensor reading. The uncertainty data can be included in the airspace data 114 or can determined by the processor(s) 124 based on the type of sensor that generated the measurement, historical data, etc. The uncertainty data can include position uncertainty associated with a position of the aircraft 160, position uncertainty associated with a position of the navigation hazard 170, relative position uncertainty associated with a distance and direction between the aircraft 160 and the navigation hazard 170, velocity uncertainty associated with a velocity of the aircraft 160, velocity uncertainty associated with a velocity of the navigation hazard 170, or a combination thereof. Uncertainty data can be provided, received, or retrieved from multiple different sources. For example, the uncertainty data can come from sensor parameters, regulatory standards, navigation performance standards, or a combination thereof. The uncertainty data can be adjusted (e.g., dynamically) based on flight conditions to determine position uncertainty, velocity uncertainty, or both, e.g., the uncertainty data can be a configurable variable. As an illustrative, non-limiting example, uncertainty data could be included in a data table and includes particular uncertainty data that indicates for a particular speed sensor (e.g., a pitot static tube) that a magnitude of velocity uncertainty is within "A" percent when at "X" altitude and is within "B" percent when at "Y" altitude. Additionally, a resolution of data inputs (indicating position, heading, speed, etc.) would influence the uncertainty in position data, velocity data, or both. For example, uncertainty in data would increase when a particular sensor has less resolution, e.g., when the particular sensor produces sensor data that has less significant digits as compared to other sensors.

In FIG. 1, the instructions 132 include flight control instructions 134, sphere analysis instructions 138, intersection analysis instructions 136, and graphical user interface (GUI) generation instructions 140. The flight control instructions 134, the sphere analysis instructions 138, the intersection analysis instructions 136, and the GUI generation instructions 140 are illustrated as separate modules within the instructions 132 in FIG. 1 merely as a convenience. In some implementations, two or more modules corresponding to the flight control instructions 134, the sphere analysis instructions 138, the intersection analysis instructions 136, and the GUI generation instructions 140 are combined. To illustrate, the sphere analysis instructions 138 and the intersection analysis instructions 136 can be combined into a single application. In other implementations, the instructions 132 include different modules or more modules than are illustrated in FIG. 1. To illustrate, the sphere analysis instructions 138 can be separated into several modules, such as a module to identify bounding vectors based on the position and velocity data 144, a module to select a set of the bounding vectors for analysis, and a module to determine a set of Apollonius circles or Apollonius spheres based on the selected set of bounding vectors.

The flight control instructions 134 are executable by the processor(s) 124 to cause or enable the processor(s) 124 to receive input from a pilot via the input device(s) 128 and to generate commands (such as the command 116) for the aircraft 160 based on the input. In some implementations, the flight control instructions 134 can also, or in the alternative, include an autopilot system that controls the aircraft 160 autonomously or semi-autonomously (e.g., autonomously within pilot specified parameters). In some implementations, the input device(s) 128 include traditional aircraft flight input devices, such as a stick, a throttle handle, a yoke, pedals, or other aircraft inceptors. In other implementations, the input device(s) 128 include computer/gaming type input devices, such as a mouse, a keyboard, a joystick, or a game system controller. In yet other implementations, the input device(s) 128 include a combination of traditional aircraft flight input device, computer/gaming-type input device, other devices (e.g., gesture-, speech-, or motion-based controllers). The pilot can use the input device(s) 128 to directly command flight control effectors of the aircraft 160, such as by moving an input device in a manner that indicates a specific aileron position or a specific roll angle. Alternatively, or in addition, the pilot can use the input device(s) 128 to designate waypoints and/or operating parameters, and the flight control instructions 134 can command flight control effectors of the aircraft 160 based on the waypoint and/or operation parameters.

The GUI generation instructions 140 are executable by the processor(s) 124 to cause or enable the processor(s) 124 to generate the display 150 and to provide the display 150 to the display device(s) 130. In a particular implementation, the display 150 includes a map 152 representing a geographic area near the aircraft 160 and graphical features 154 that represent the aircraft 160, the navigation hazard 170, flight status information, flight advice, and other information. The content and arrangement of the graphical features 154 can be determined based on settings 158 in the memory 126. The settings 158 indicate pilot display preferences and other user selectable preferences regarding presentation of information by the aircraft flight information system 104.

The sphere analysis instructions 138 are executable by the processor(s) 124 to determine a plurality of bounding vectors based on the position and velocity data 144, as described further below. The sphere analysis instructions 138 are also executable to select a set of the bounding vectors for analysis. The bounding vectors selected for further analysis are used to determine circular or spherical regions that bound candidate intersection points. For example, the selected bounding vectors are used to generate data representing a plurality of Apollonius circles or Apollonius spheres. In a particular implementation, all of the bounding vectors identified by the sphere analysis instructions 138 are selected and used to generate Apollonius circles or Apollonius spheres. In other implementations, a subset of the bounding vectors identified by the sphere analysis instructions 138 are selected and used to generate Apollonius circles or Apollonius spheres. In yet other implementations, a subset of the bounding vectors identified by the sphere analysis instructions 138 are selected and used to generate a first set of Apollonius circles or Apollonius spheres for a coarse estimate (e.g., to determine whether a potential loss of separation is indicated) and a larger subset, a different subset, or all of the bounding vectors identified by the sphere analysis instructions 138 are selected and used to generate a second set of Apollonius circles or Apollonius spheres for a fine estimate if a potential loss of separation is indicated by the coarse estimate. In such implementations, the aircraft flight information system 104 more quickly updates the display device(s) 130 responsive to changes in position, velocity, position uncertainty, and velocity uncertainty at partial fidelity or precision, and then over time (e.g., subsequent processing cycles) updates or refines the coarse estimate with one or more finer estimates to provide full fidelity or precision.

The selected bounding vectors include one or more relative position vectors, one or more velocity vectors for the aircraft 160, and one or more velocity vectors for the navigation hazard 170. Each relative position vector of the one or more relative position vectors indicates a direction and distance between the aircraft 160 and the navigation hazard 170. If the position and velocity data 144 includes position uncertainty data related to the position of the aircraft 160 or the position of the navigation hazard 170, the selected bounding vectors can include more than one relative position vector. In this situation, each relative position vector is referred to herein as a bounding relative position vector, i.e., a bounding vector that is a relative position vector. Position uncertainty can include vertical position uncertainty (i.e., altitude uncertainty), horizontal position uncertainty, or both.

Each velocity vector indicates a speed and a direction. If the position and velocity data 144 includes velocity uncertainty data related to the velocity of the aircraft 160, the selected bounding vectors can include more than one velocity vector for the aircraft 160. Likewise, if the position and velocity data 144 includes velocity uncertainty data related to the velocity of the navigation hazard 170, the selected bounding vectors can include more than one velocity vector for the navigation hazard 170. As used herein a bounding vector that is a velocity vector is referred to as a bounding velocity vector. Velocity uncertainty can include uncertainty as to speed (e.g., the magnitude of the velocity vector) uncertainty as to direction of the velocity vector, or both.

The sphere analysis instructions 138 are executable by the at least one processor 124 to generate data descriptive of each Apollonius circle or Apollonius sphere based on a speed ratio (e.g., a ratio of the magnitudes of bounding velocity vectors) of the aircraft 160 and the navigation hazard 170 and relative positions (e.g., a bounding relative position vector) of the aircraft 160 and the navigation hazard 170. In the example illustrated in FIG. 1, the data descriptive of each Apollonius circle or Apollonius sphere is provided to the intersection analysis instructions 136, which identify one or more points of intersection of a line projected along a direction of one of the velocity vectors and an Apollonius circle or Apollonius sphere. Alternatively, or in addition, the intersection analysis instructions 136 can determine a point of closest approach of the line projected along a direction of one of the velocity vectors and an Apollonius circle or Apollonius sphere. The point(s) of intersection or point of closest approach (along with points of intersection or point of closest approach from analyses based on other bounding vectors) define a region of interest. Data describing the region of interest is provided to the GUI generation instructions 140 to generate a situational awareness display (e.g., the display 150) for the pilot. Alternatively, or in addition, the data describing the region of interest can be utilized by the flight control instructions 134 to automatically or semi-automatically generate the commands 116 to cause the aircraft 160 to maneuver to avoid the region of interest.

In a particular implementation, a region of interest is an area in which a separation violation condition may occur. A separation violation condition occurs when the aircraft 160 is less than a separation threshold (e.g., a threshold distance or a threshold time) from the navigation hazard 170. The separation threshold can be specified by the pilot (e.g., as part of the settings 158), can be specified by an organization (e.g., a military, government, or commercial organization) associated with the aircraft 160 or the navigation hazard 170, can be specified by a regulatory agency, or can be specified by a standards organization. In some implementations, the thresholds 142 can include multiple different separation thresholds, and the specific separation threshold used to determine whether a separation violation condition is expected to occur is determined based on conditions or parameter values at the time when the airspace data 114 is received. For example, the specific separation threshold used can depend on weather conditions, an aircraft type of the aircraft 160, the class of airspace, the nature or identity of the navigation hazard 170, mission parameters, and so forth. To illustrate, a smaller separation threshold can be used when the aircraft 160 is unmanned and the navigation hazard 170 is another unmanned aircraft than may be used if either of the aircraft 160 or the navigation hazard 170 is a manned aircraft.

In some implementations, the GUI generation instructions 140 are executable by the at least one processor 124 to generate a graphical feature 154 to overlay the map 152 in an area corresponding to the region of interest. Alternatively, or in addition, the GUI generation instructions 140 generate an advice band or other graphical feature to indicate to the pilot that the pilot should not direct the aircraft 160 in a direction corresponding to the region of interest.

In a particular implementation, the flight control instructions 134 can limit operations that the pilot can perform based on the region of interest. For example, the flight control instructions 134 can prevent the pilot from designating a waypoint for the aircraft 160 that is within the region of interest. For example, if the pilot provides input that designates a waypoint, the command 116 can be generated and sent to the aircraft 160 based on a determination that the waypoint is not located in the region of interest. Alternatively, the flight control instructions 134 can allow the pilot to designate the waypoint within the region of interest, but may require the pilot to perform one or more additional steps, such as a confirming that the pilot understands that the waypoint is within the region of interest. For example, based on determining that the waypoint is within the region of interest, the aircraft flight information system 104 can generate output advising the pilot that the waypoint is within the region of interest, and await confirmation from the pilot before setting the waypoint.

Figure 2A:
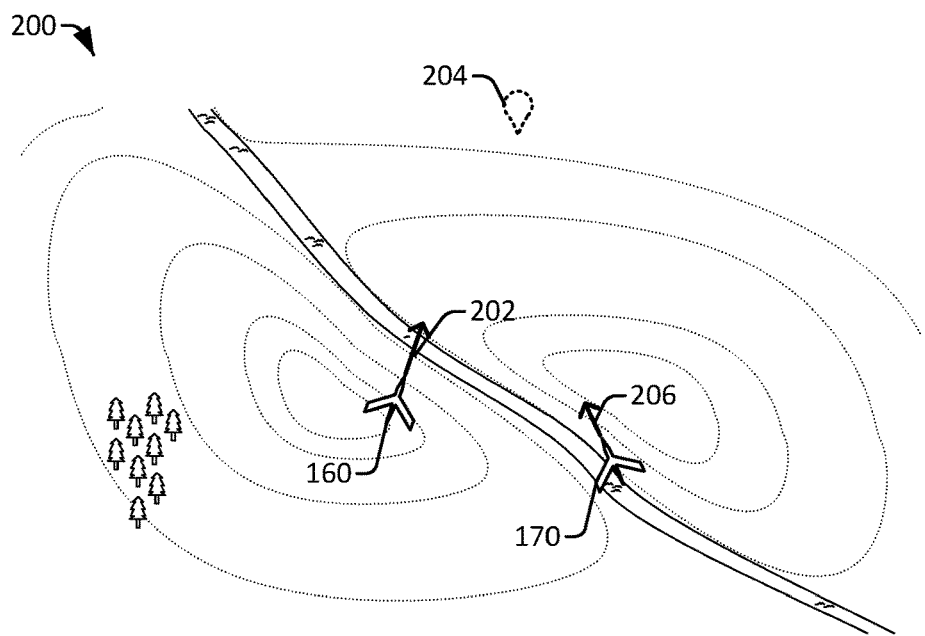
FIG. 2A is a diagram that illustrates an example of an airspace.

FIG. 2A is a diagram that illustrates an example of an airspace 200 in which multiple aircraft are present. The multiple aircraft include the aircraft 160 and another aircraft, which corresponds to the navigation hazard 170. FIG. 2 also illustrates a heading of each aircraft in the airspace 200. For example, the aircraft 160 has a heading 202, and the navigation hazard 170 has a heading 206. In the example illustrated in FIG. 2, the heading 202 of the aircraft 160 is toward a waypoint 204.

Figure 2B:
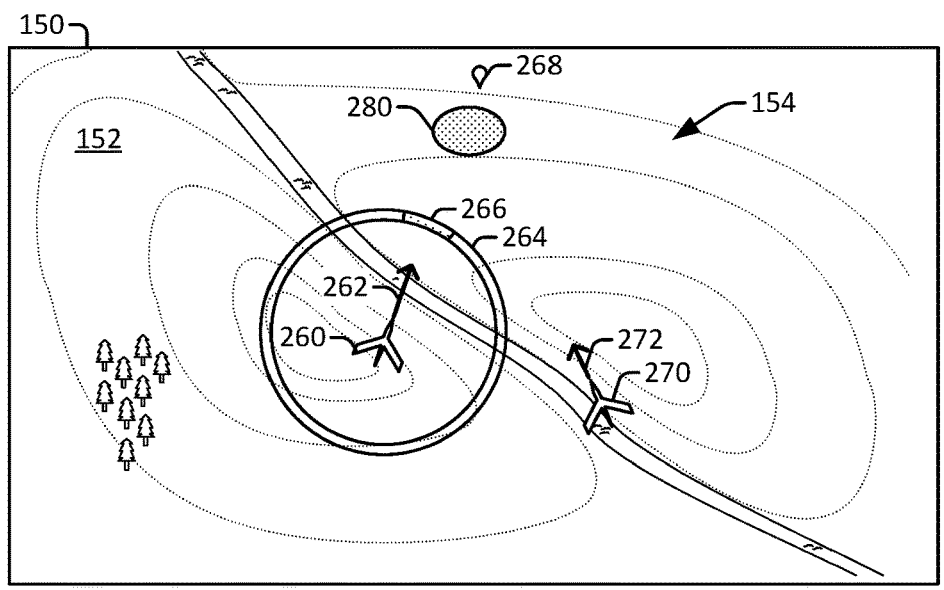
FIG. 2B is a diagram that illustrates a display illustrating the airspace of FIG. 2A.

FIG. 2B is a diagram that illustrates an example of the display 150 for the airspace 200 represented in FIG. 2A. The display 150 includes the map 152 and graphical features 154 representing the aircraft 160 and the navigation hazard 170. For example, the graphical representation 260 represents the aircraft 160 and a graphical representation 270 represents the navigation hazard 170. In FIG. 2B, the graphical features 154 also include a graphical representation 268 of the waypoint 204 and a graphical representation 280 of a region of interest. The region of interest is based on a projected intersection of the aircraft 160, the navigation hazard 170, or both, with a candidate intersection point of a plurality of candidate intersection points determined based on bounding vectors associated with the aircraft 160 and the navigation hazard 170, as explained further below.

The graphical features 154 also include a ring 264 around the graphical representation 260 of the aircraft 160 and an advice band 266. The ring 264 helps the pilot to quickly distinguish the graphical representation 260 of the aircraft 160 (e.g., the aircraft being piloted) from other graphical features, which can include graphical representations of other aircraft, such as the navigation hazard 170. The ring 264 can also include or be associated with other situational awareness data, such as data indicating an altitude of the aircraft 160, an identifier or type of the aircraft 160, etc. In some implementations, as size of the ring 264 is related to a speed of the aircraft 160. For example, the ring 264 can be sized such that the radius of the ring 264 corresponds to a distance the aircraft 160 will travel during a particular period (e.g., 3 minutes) based on its current speed. In such implementations, the size of the ring 264 together with a graphical indication 262 of the heading 202 (along with information about the relationship between the heading 202 and the course of the aircraft 160) gives the pilot an indication of the velocity vector of the aircraft 160.

The advice band 266 is an indication to the pilot of "do not steer" direction. That is, the advice band 266 identifies a steering direction that should be avoided due to the presence of the region of interest.

While FIGS. 1 and 2, and the examples described below, refer to only one aircraft 160 and one navigation hazard 170, the airspace 200 can include more than one aircraft 160, more than one navigation hazard 170, or both. For example, in a "crowded" airspace, many aircraft 160 can be present. In this situation, each aircraft 160 can fill both the role of the aircraft 160 (e.g., when determining where hazards to its own navigation are located) as well as the role of navigation hazard 170 for other aircraft. Stated another way, every aircraft 160 can be considered a navigation hazard 170 for every other aircraft 160. In such situations, the methods described herein can be performed in a pairwise manner, where each pair includes one aircraft 160 and one navigation hazard 170, to detect regions of interest for each pair.

Figure 3A:
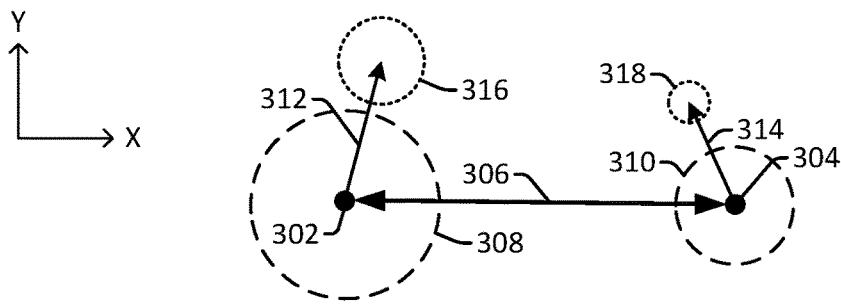
FIGS. 3A, 3B, and 3C illustrate various aspects of position and velocity uncertainty of aircraft and navigation hazards.
Figure 3B:
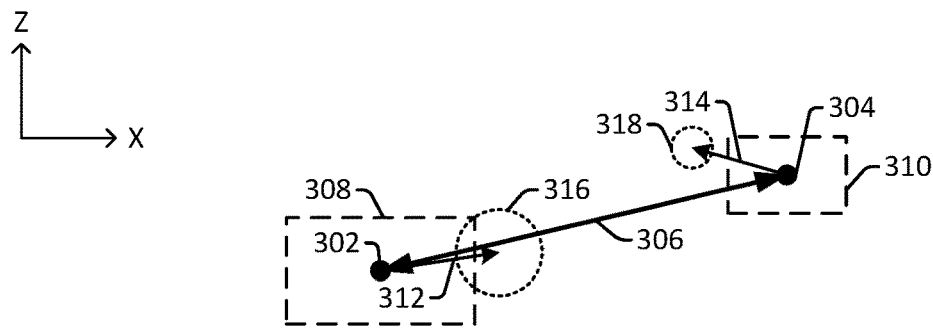
Figure 3C:
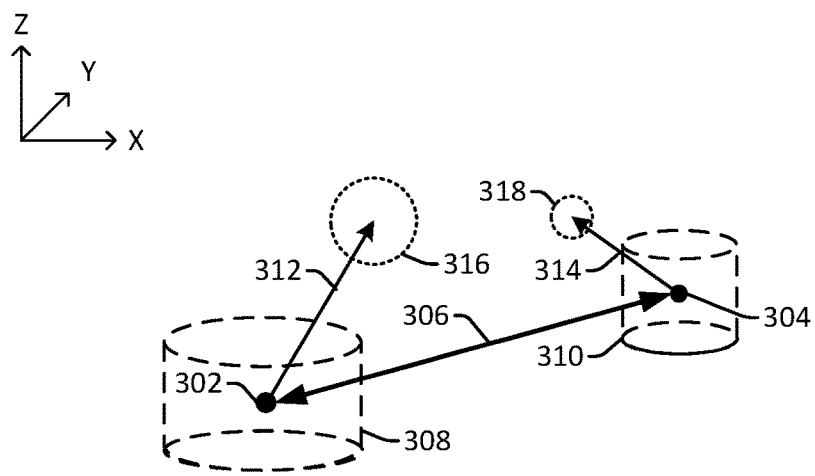
Figure 4A:
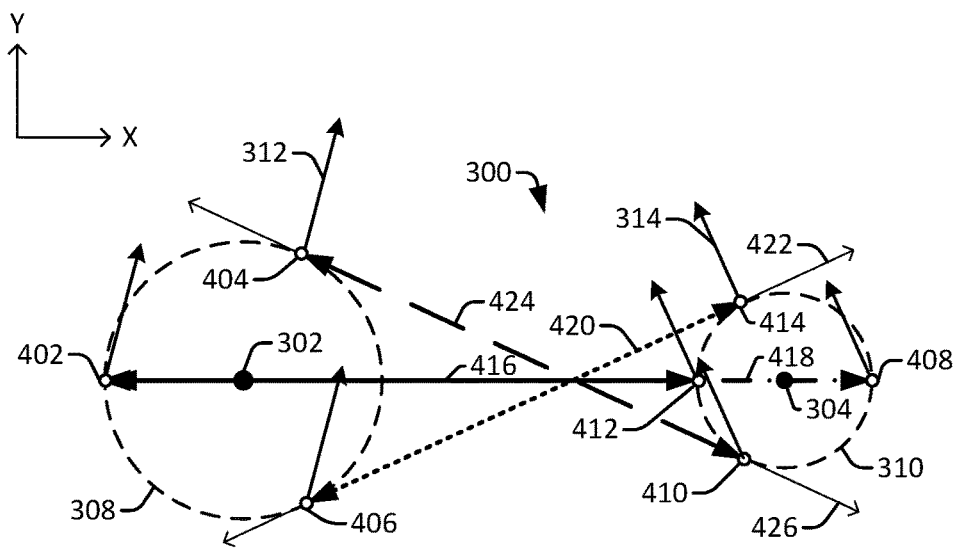
FIGS. 4A, 4B, and 4C illustrate aspects of position uncertainty of aircraft and navigation hazards in more details.
Figure 4B:
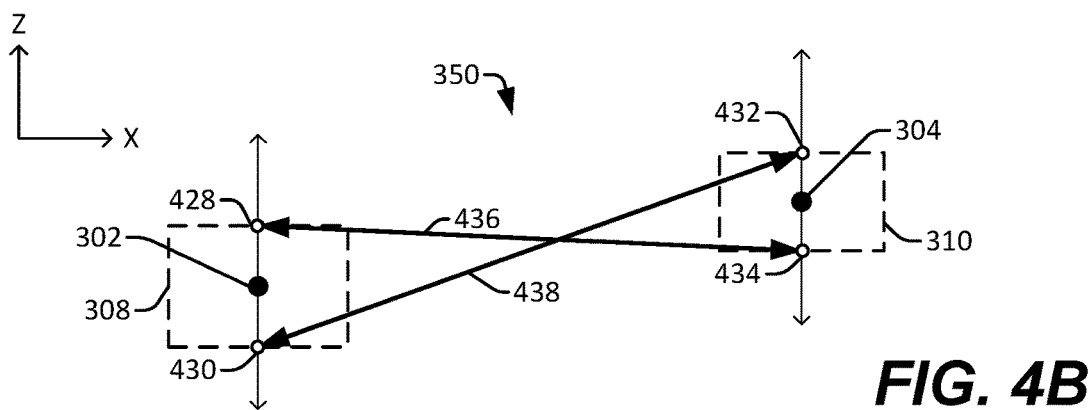
Figure 4C:
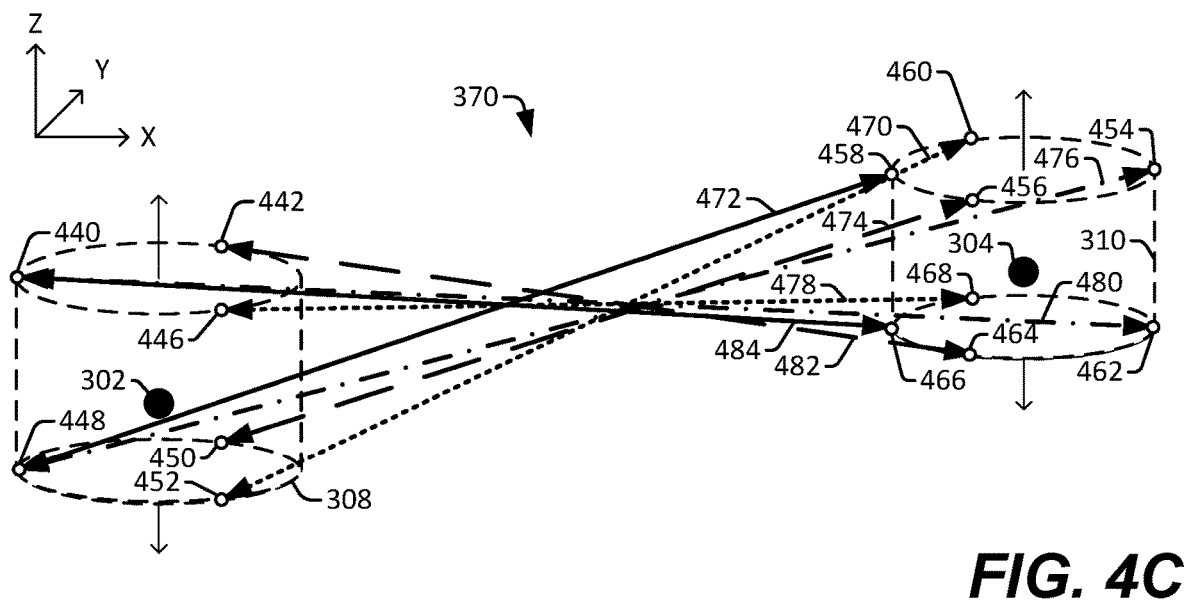
Figure 5A:
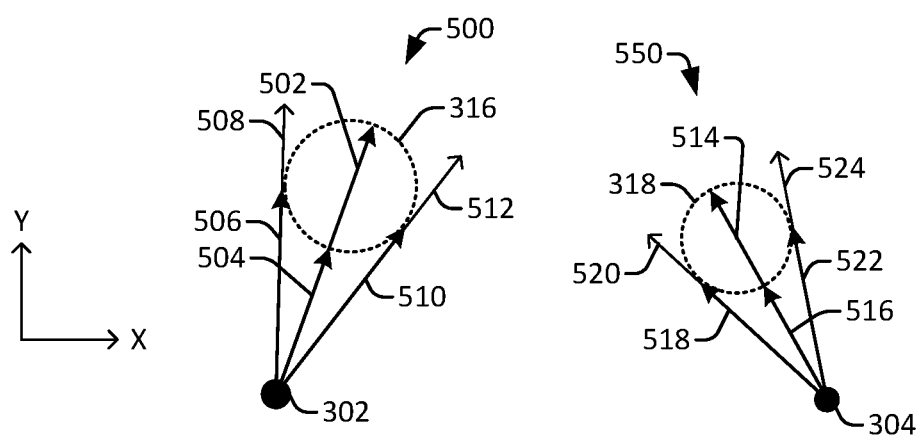
FIGS. 5A and 5B illustrate aspects of velocity uncertainty of aircraft and navigation hazards in more details.
Figure 5B:
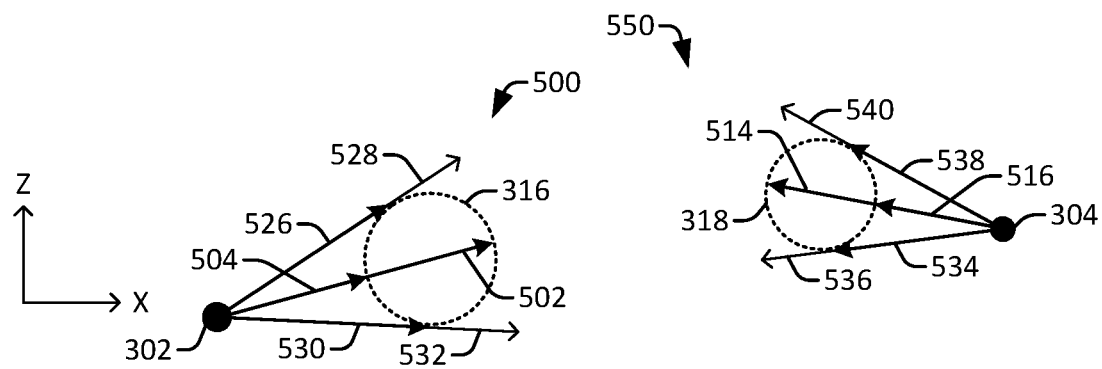
Figure 8A:
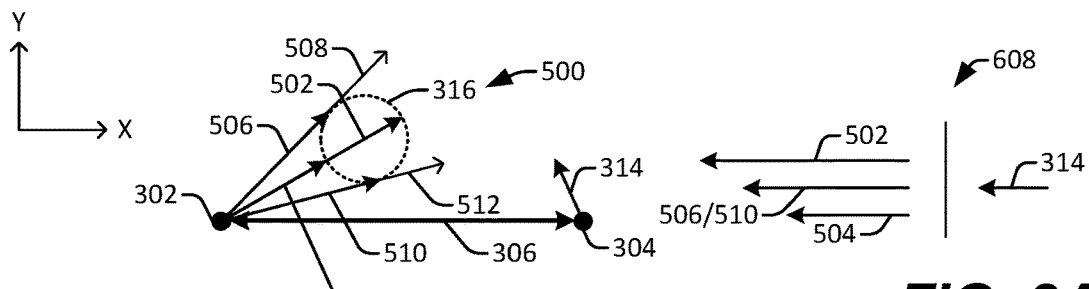
FIGS. 8A, 8B, and 8C illustrate aspects of a method of generating data describing an Apollonius circle based on velocity vectors, a relative position vector, and velocity uncertainty.
Figure 8B:
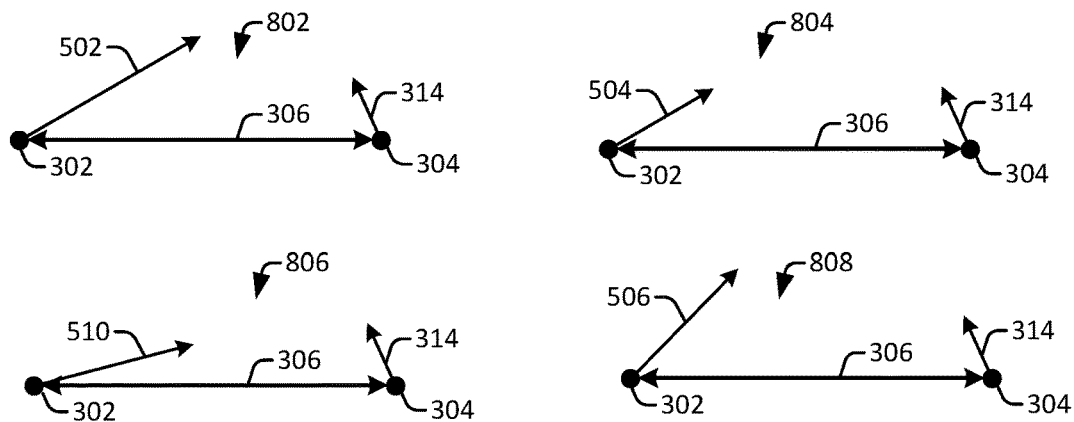
Figure 8C:
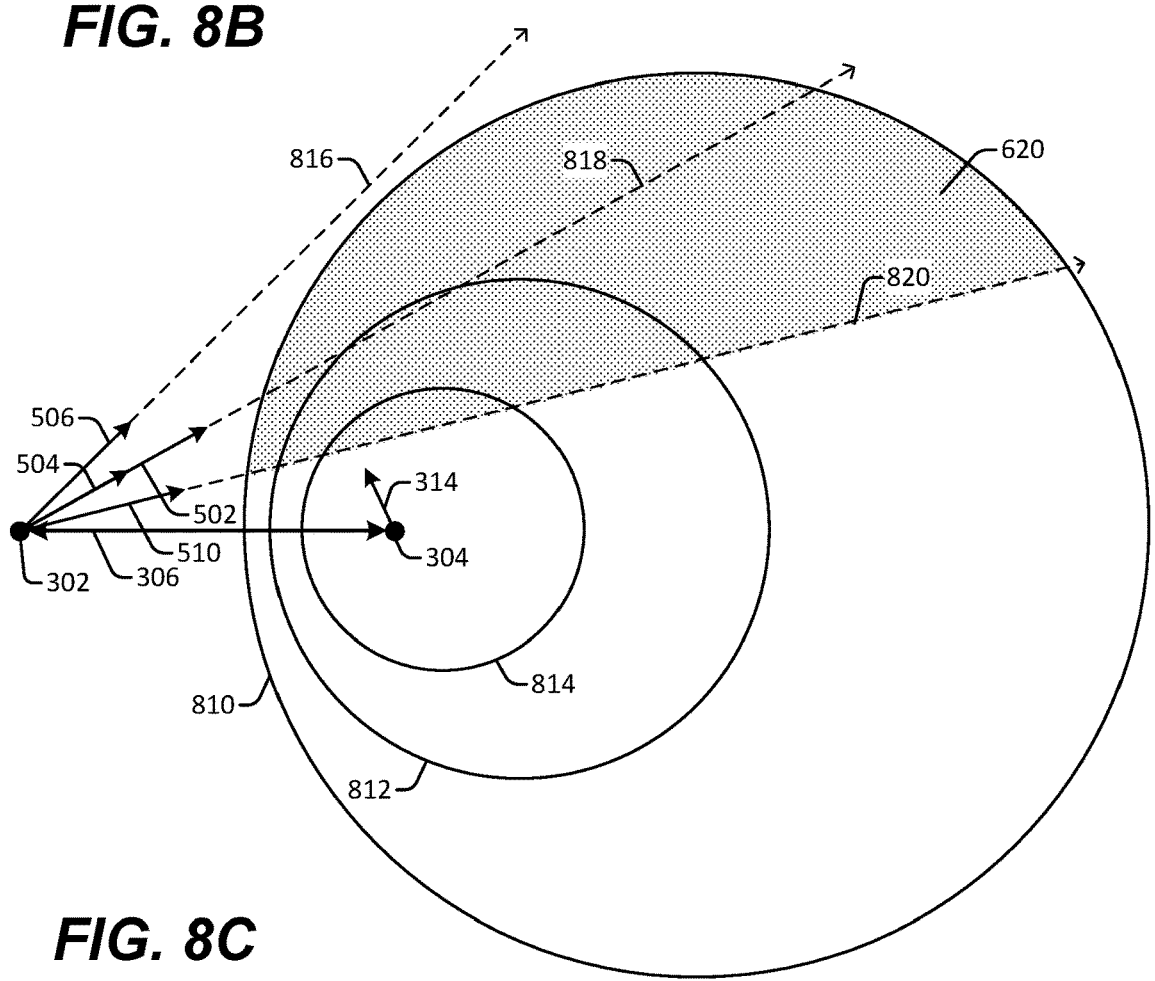
Figure 9A:
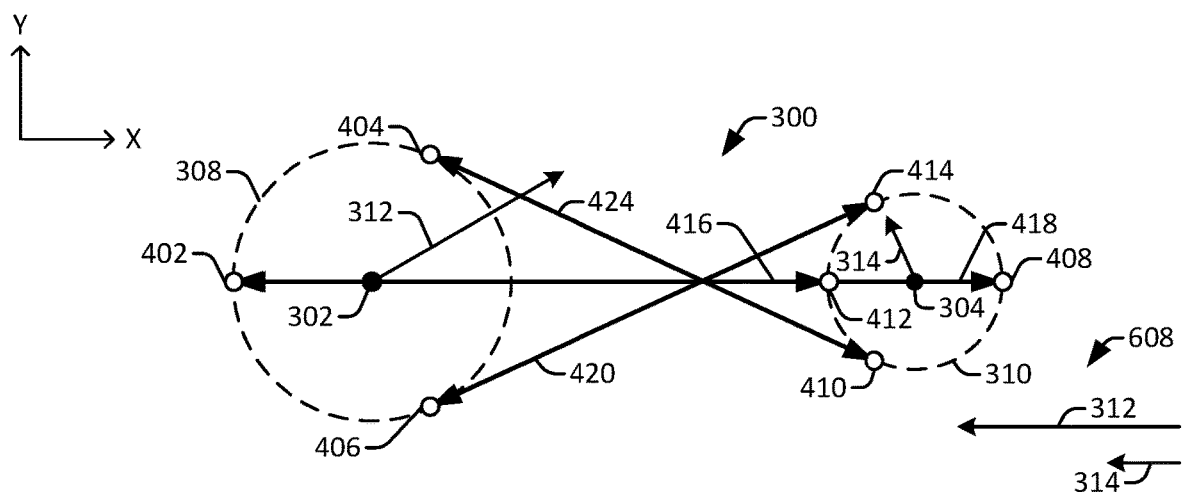
FIGS. 9A, 9B, and 9C illustrate aspects of a method of generating data describing an Apollonius circle based on velocity vectors, a relative position vector, and position uncertainty.
Figure 9B:
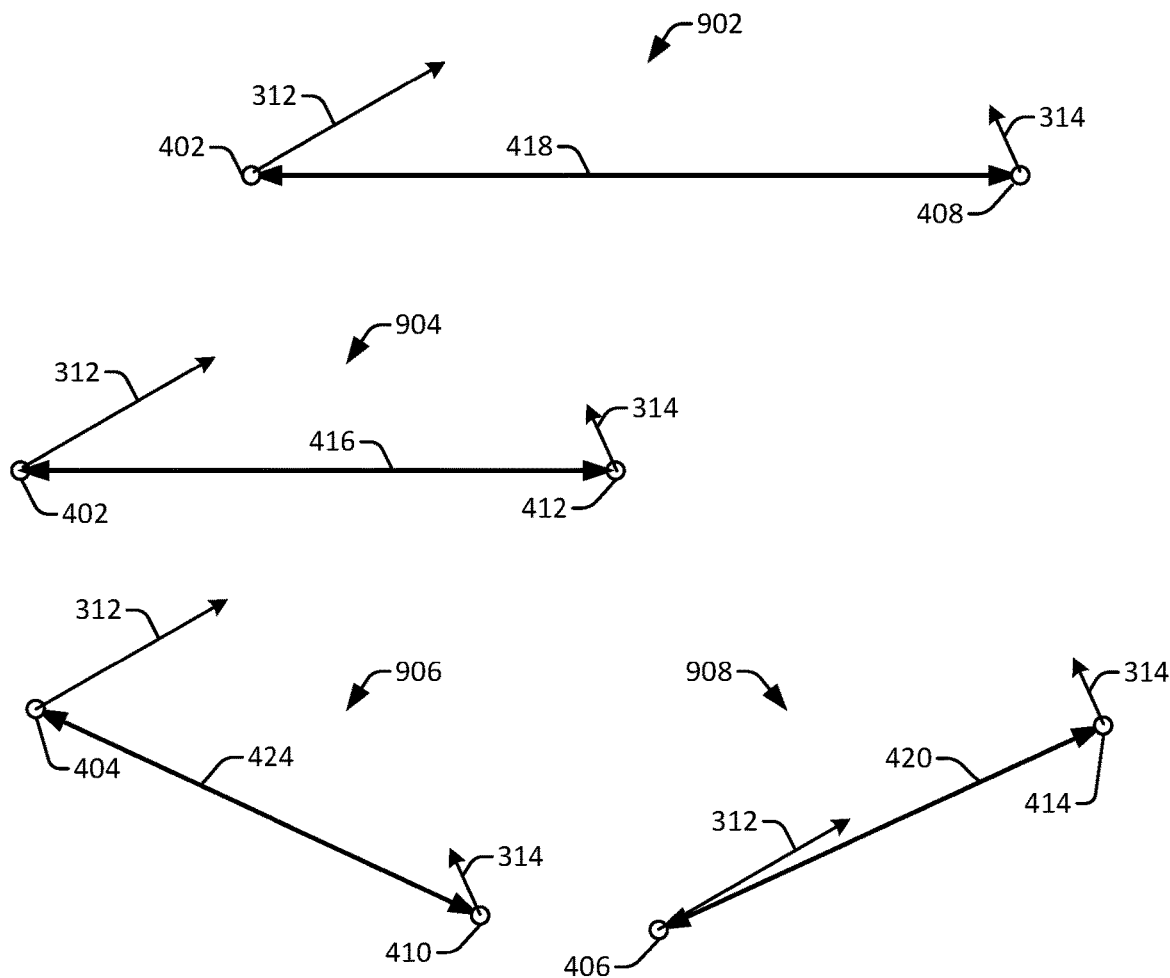
Figure 9C:
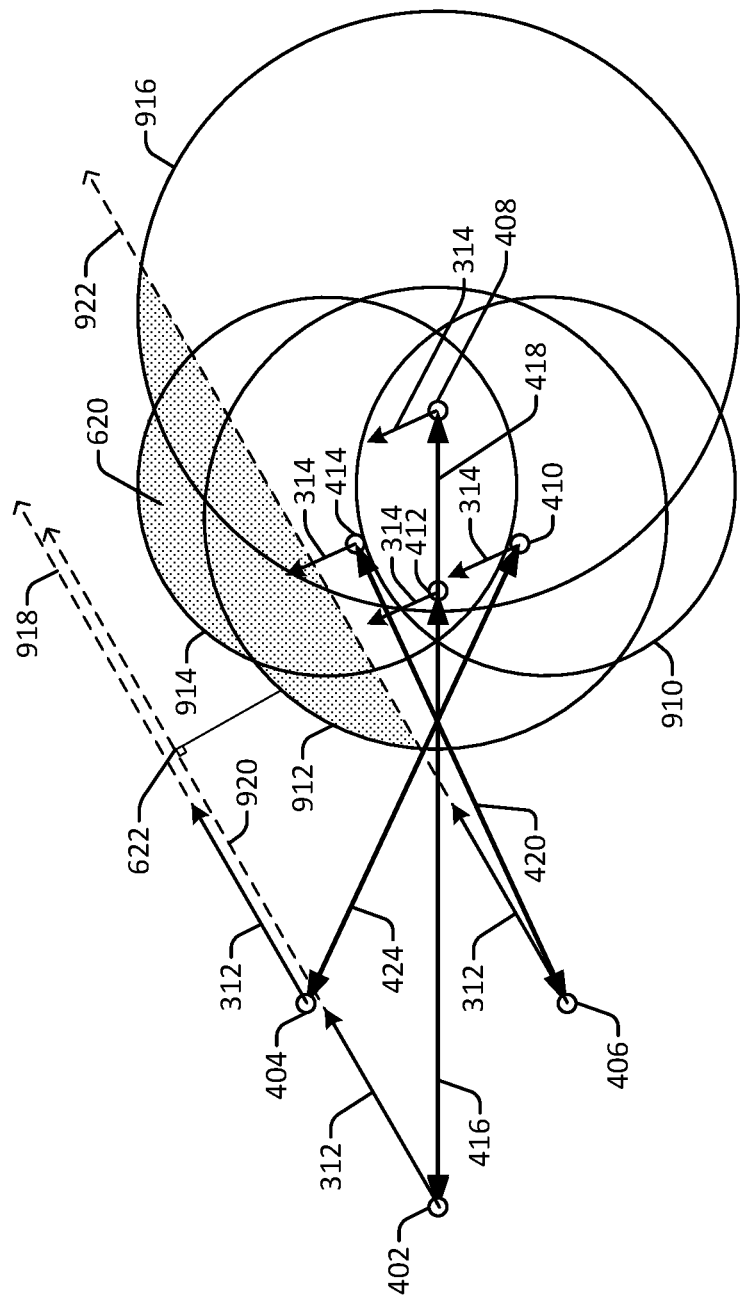
Figure 10A:
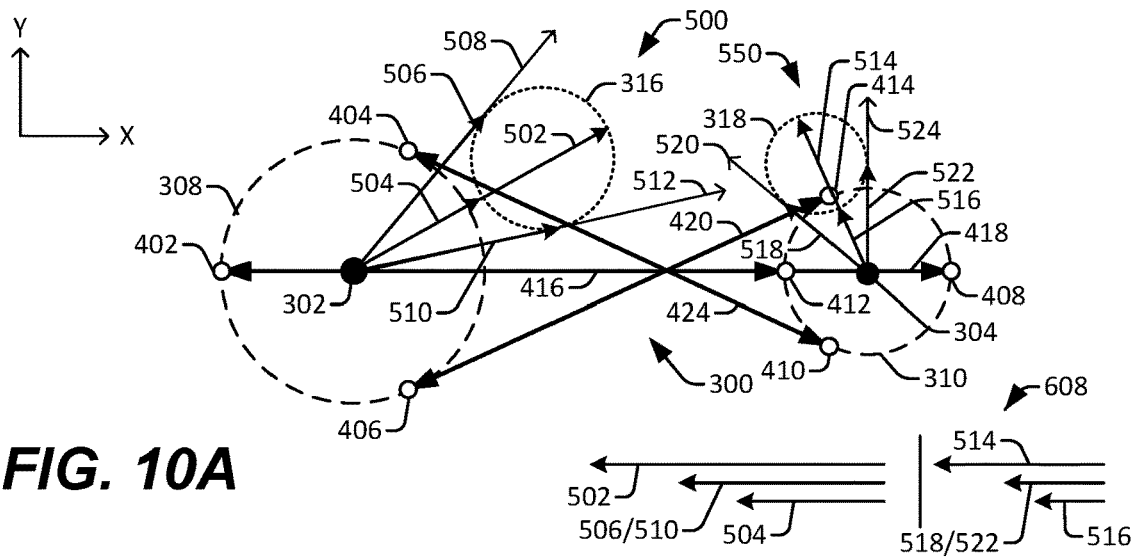
FIGS. 10A and 10B illustrate aspects of a method of generating bounding vectors based on velocity vectors, a relative position vector, position uncertainty, and velocity uncertainty.
Figure 10B:
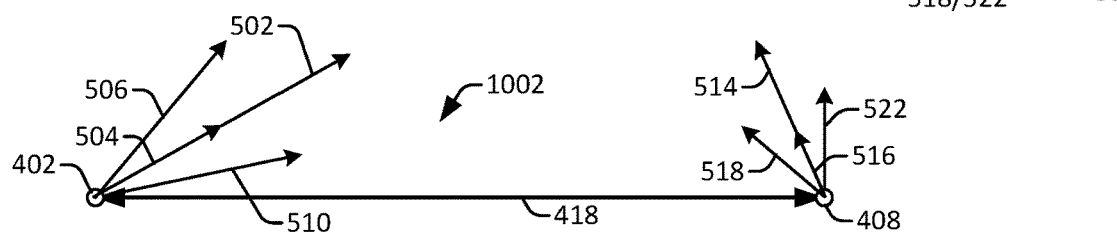
Figure 10B:
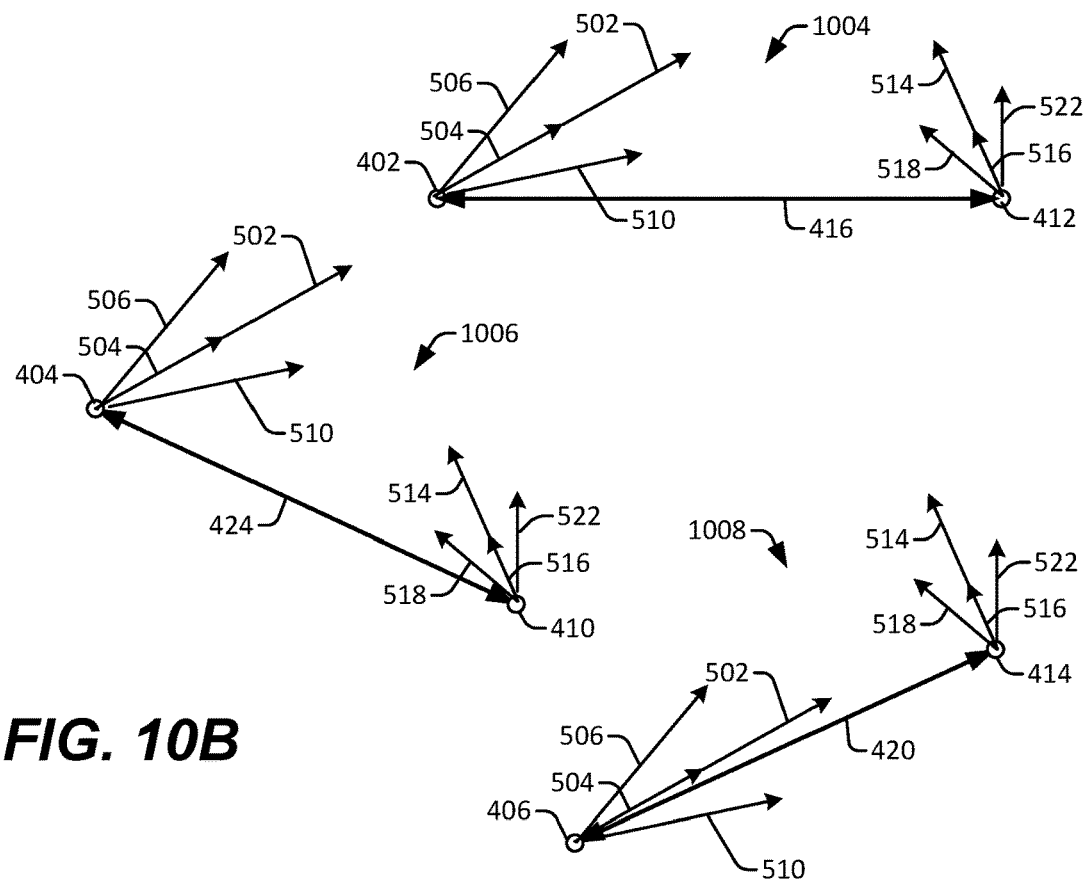
Figure 11A:
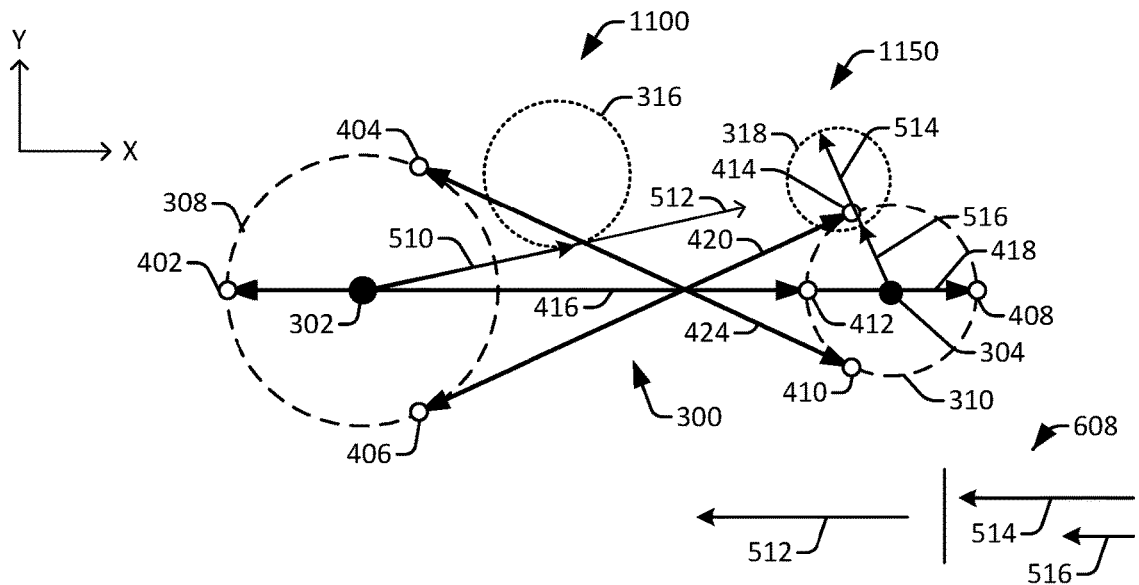
FIGS. 11A and 11B illustrate aspects of a method of generating a reduced or simplified set of bounding vectors based on the bounding vectors of FIGS. 10A and 10B.
Figure 11B:
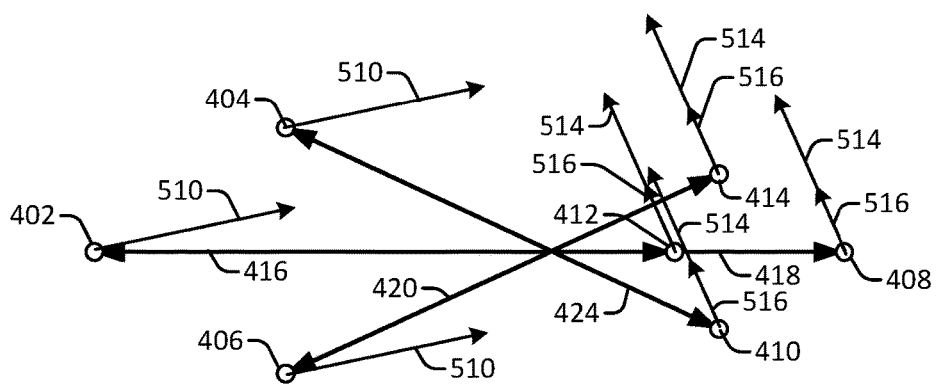
Figure 11C:
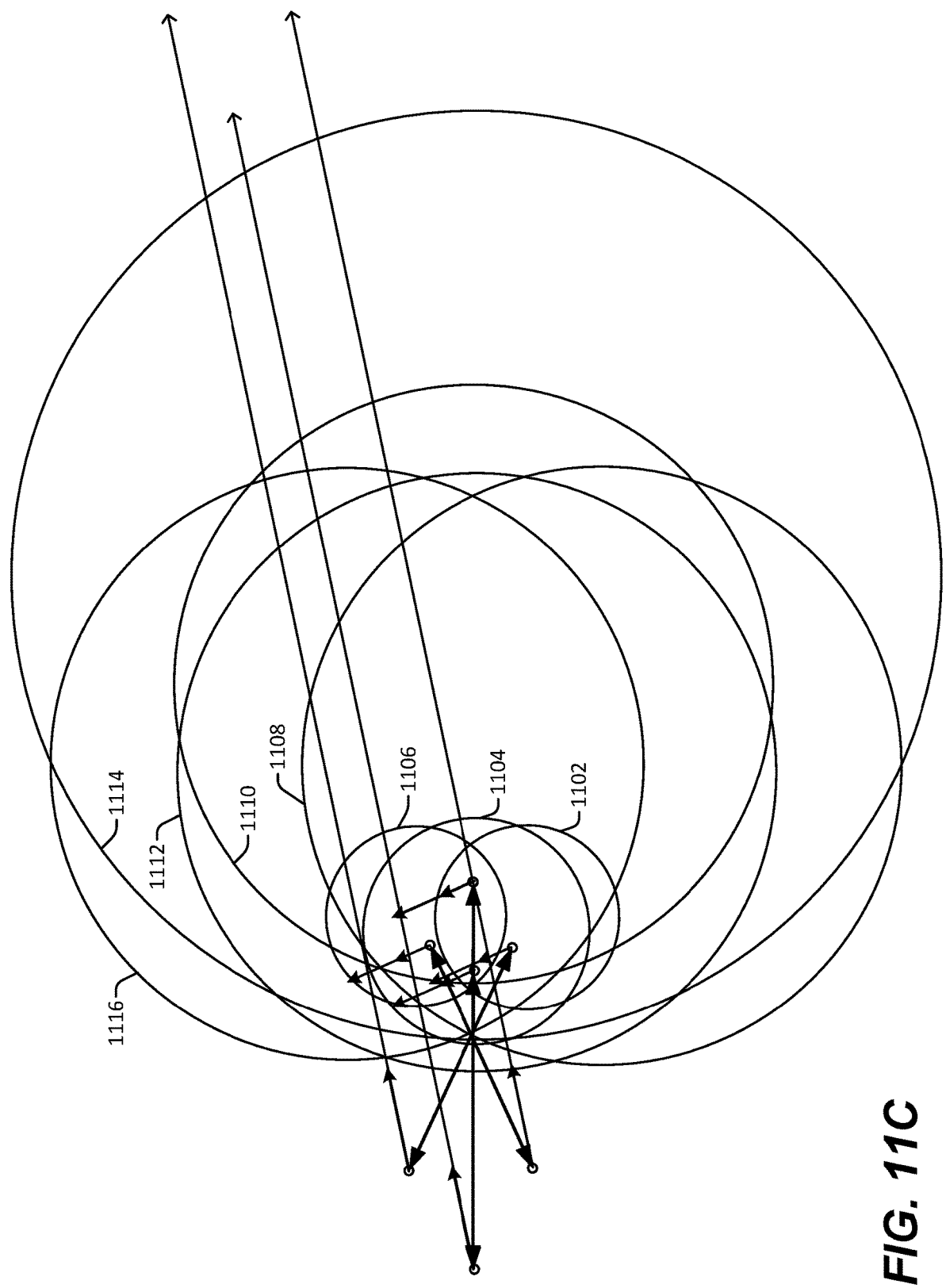
FIG. 11C illustrates one or more aspects of a method of generating data describing an Apollonius circle based on the set of bounding vectors of FIGS. 11A and 11B.
Figure 12A:
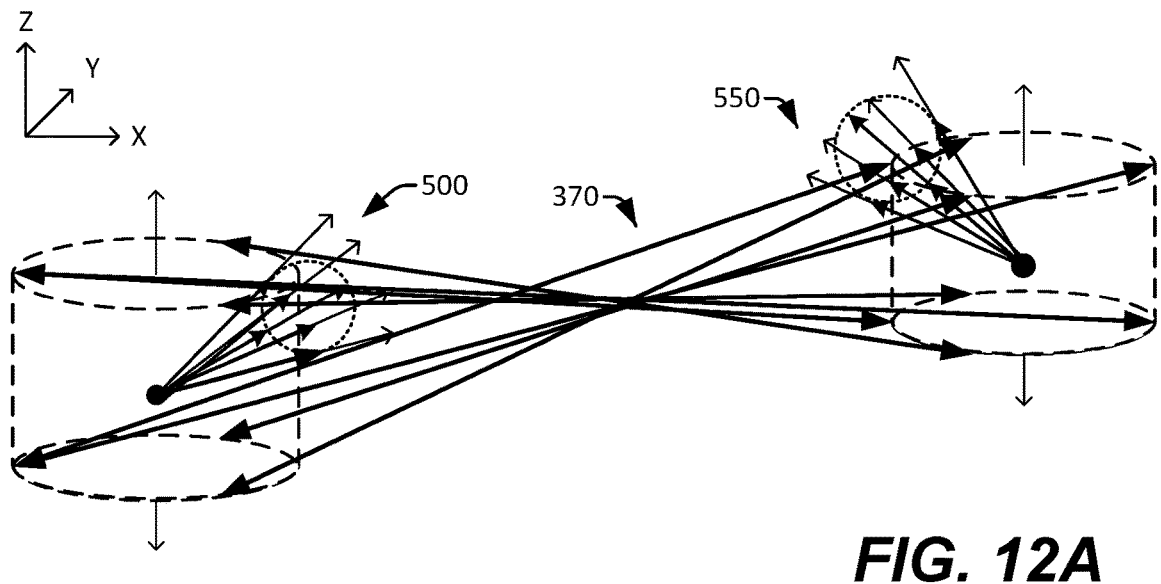
FIGS. 12A and 12B illustrate aspects of a method of generating bounding vectors based on velocity vectors, a relative position vector, position uncertainty, and velocity uncertainty.
Figure 12B:
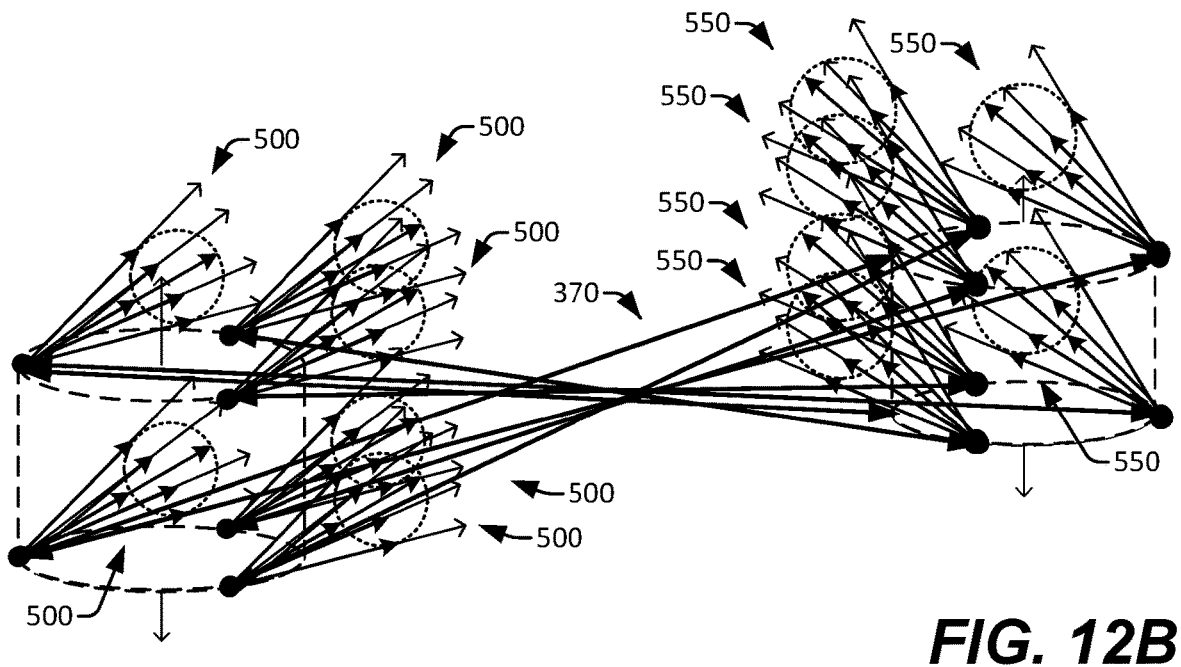
Figure 13A:
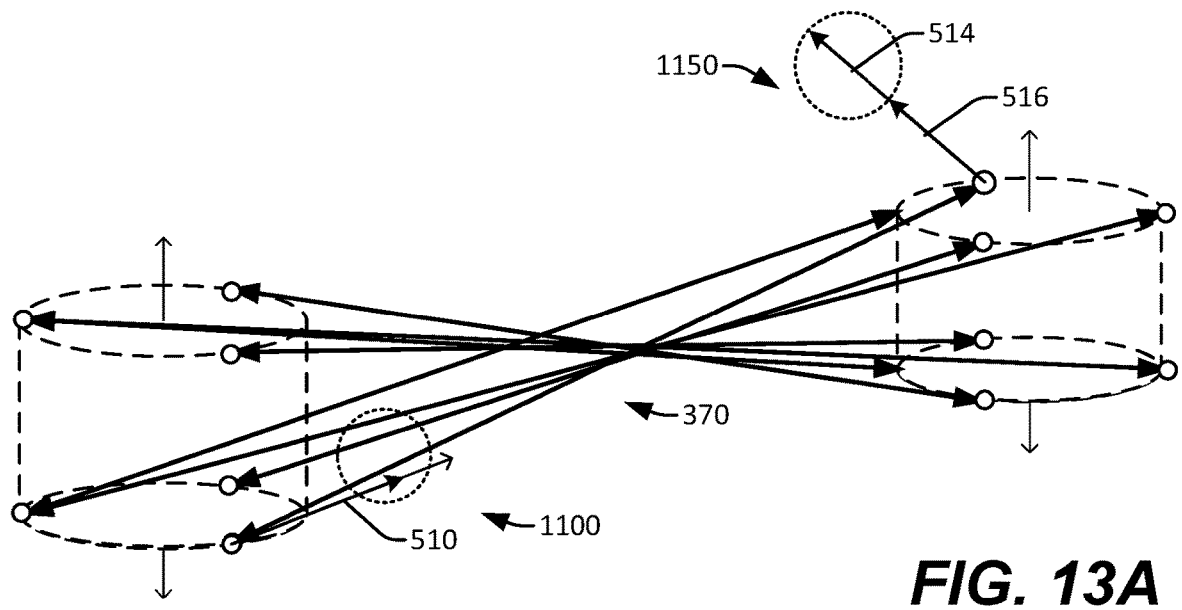
FIGS. 13A and 13B illustrate a method of generating a reduced or simplified set of bounding vectors based on the bounding vectors of FIGS. 12A and 12B.
Figure 13B:
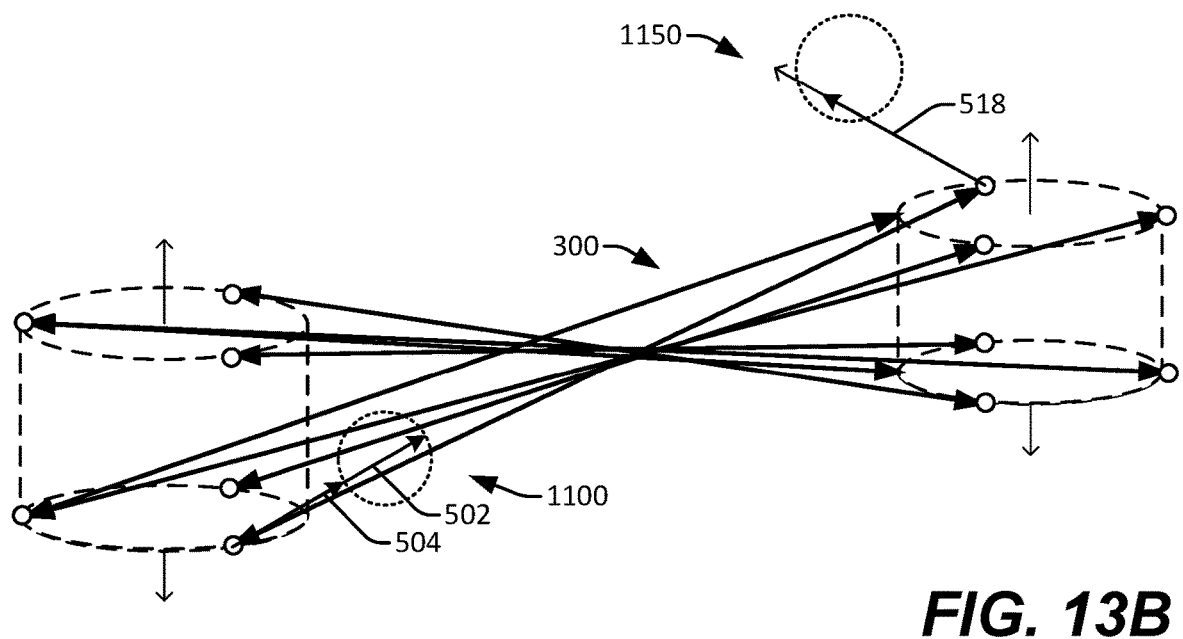

FIGS. 3A-13B illustrate various aspects of determining the region of interest based on bounding vectors. In particular, FIGS. 3A, 3B, and 3C illustrate various aspects of position and velocity uncertainty, FIGS. 4A, 4B and 4C illustrate aspects of position uncertainty in more details, and FIGS. 5A and 5B illustrate aspects of velocity uncertainty in more details. FIGS. 6A-7C illustrate aspects of a method of generating data describing an Apollonius circle or a portion of an Apollonius sphere (depicted in two-dimensions) based on velocity vectors, a relative position vector, and position uncertainty for either the aircraft 160 or the navigation hazard 170 (e.g., one-sided uncertainty). FIGS. 8A-8C illustrate aspects of a method of generating data describing an Apollonius circle or a portion of an Apollonius sphere (depicted in two-dimensions) based on velocity vectors, a relative position vector, and velocity uncertainty for either the aircraft 160 or the navigation hazard 170 (e.g., one-sided uncertainty). FIGS. 9A-9C illustrate aspects of a method of generating data describing an Apollonius circle or a portion of an Apollonius sphere (depicted in two-dimensions) based on velocity vectors, a relative position vector, and position uncertainty for both the aircraft 160 and the navigation hazard 170 (e.g., two-sided uncertainty). FIGS. 10A-10B illustrate aspects of a method of generating bounding vectors (in two-dimensions) based on velocity vectors, a relative position vector, position uncertainty for both the aircraft 160 and the navigation hazard 170 (e.g., two-sided uncertainty), and velocity uncertainty for both the aircraft 160 and the navigation hazard 170 (e.g., two-sided uncertainty). FIGS. 11A-11B illustrate aspects of a method of generating a reduced or simplified set of bounding vectors (in two-dimensions) based on the bounding vectors of FIGS. 10A-10B. FIG. 11C illustrates one or more aspects of a method of generating data describing an Apollonius circle or a portion of an Apollonius sphere (depicted in two-dimensions) based on the set of bounding vectors of FIGS. 11A-11B. FIGS. 12A-12B illustrate aspects of a method of generating bounding vectors (in three-dimensions) based on velocity vectors, a relative position vector, position uncertainty for both the aircraft 160 and the navigation hazard 170 (e.g., two-sided uncertainty), and velocity uncertainty for both the aircraft 160 and the navigation hazard 170 (e.g., two-sided uncertainty). FIGS. 13A-13B illustrate aspects of a method of generating a reduced or simplified set of bounding vectors (in three-dimensions) based on the bounding vectors of FIGS. 12A-12B.

FIG. 3A is a diagram illustrating position and velocity uncertainty in two-dimensions (e.g., along an X axis and a Y axis). For purposes of the description herein, the diagram in FIG. 3A is considered to be a horizontal plane, and thus, the position uncertainty is referred to herein as horizontal position uncertainty and the velocity uncertainty is referred to herein as horizontal velocity uncertainty. FIG. 3A also includes a vector key illustrating how velocity vectors and relative position vectors are illustrated to facilitate distinguishing the two types of vectors in FIGS. 3A-13B.

FIG. 3A illustrates two reported positions including a first position 302 and a second position 304. One of the positions 302, 304 corresponds to the position of the aircraft 160 of FIG. 1, and the other of the positions 302, 304 corresponds to the position of the navigation hazard 170 of FIG. 1. For convenience of description, the position 302 is described as corresponding to the position of the aircraft 160, and the position 304 is described as corresponding to the position of the navigation hazard 170; however, this description is merely for convenience and is not a limitation.

For purposes of detecting regions of interest (e.g., points of closest approach, loss of separation, or points of possible intersection), absolute position of the aircraft 160 and the navigation hazard 170 is not needed; relative position is sufficient. FIG. 3A illustrates a relative position vector 306 which indicates a direction and distance between the positions 302, 304. Since relative position can be used, the directions of the X and Y axes of the coordinate system are arbitrary. For purpose of illustration, and to simplify the geometric calculations, the positions 302 and 304 can be assumed to be on the X axis with the position 302 at an origin of the coordinate system.

As indicated above, the positions 302, 304 are reported positions (e.g., positions determined based on measurements) and as such may be subject to measurement error. As a result of the measurement error, the actual position of the aircraft 160 could be displaced from the reported position 302 in either direction along the Y axis, in either direction along the X axis, or both. Likewise, the actual position of the navigation hazard 170 could be displaced from the report position 304 in either direction along the Y axis, in either direction along the X axis, or both. Accordingly, uncertainty associated with the positions 302 and 304 is illustrated in FIG. 3A using dashed-line circles and is referred to herein as horizontal position uncertainty 308 associated with the position 302 and horizontal position uncertainty 310 associated with the position 304.

FIG. 3A also illustrates a velocity vector 312 of the aircraft 160 and a velocity vector 314 of the navigation hazard 170. Each velocity vector 312, 314 has a direction (e.g., indicating the course of the aircraft 160 or the navigation hazard 170) and a magnitude (corresponding to the speed of the aircraft 160 or the navigation hazard 170). The velocity of the aircraft 160, the velocity of the navigation hazard 170, or both, may be subject to measurement error. Velocity measurement is subject to at least two kinds of measurement error including magnitude error (e.g., error as to speed) and direction error. As a result of the direction error, the actual velocity of the aircraft 160 could be angularly offset from the velocity vector 312 in either direction with respect to the X axis. That is, the angle between the X axis and the velocity vector 312 could be greater than reported or less than reported. As a result of the magnitude (or speed) error, the actual velocity of the aircraft 160 could be greater than reported or less than reported. Accordingly, velocity uncertainty 316 associated with the velocity vector 312 is illustrated in FIG. 3A using a dotted-line circle. Each point on or within the dotted-line circle corresponds to a possible end point for the velocity vector 312. Likewise, velocity uncertainty 318 associated with the velocity vector 314 is illustrated in FIG. 3A using a dotted-line circle where each point on or within the dotted-line circle corresponds to a possible end point for the velocity vector 314.

FIG. 3B illustrates the first position 302 and the second position 304 in a plane along the X axis and a Z axis of the coordinate system. Thus, FIG. 3B represents the relative positions and velocity vectors of the aircraft 160 and the navigation hazard 170 in a vertical plane.

As illustrated in FIG. 3B, the positions 302, 304 can also be subject to vertical measurement error. As a result of the vertical measurement error, the actual position (e.g., altitude) of the aircraft 160 could be displaced from the reported position 302 in either direction along the Z axis. Likewise, the actual position (e.g., altitude) of the navigation hazard 170 could be displaced from the report position 304 in either direction along the Z axis. Accordingly, uncertainty associated with the positions 302 and 304 is illustrated in FIG. 3B using dashed-line boxes and is referred to herein as vertical position uncertainty 308 associated with the position 302 and vertical position uncertainty 310 associated with the position 304.

FIG. 3B also illustrates the velocity vector 312 of the aircraft 160, the velocity vector 314 of the navigation hazard 170, and the relative position vector 306. As illustrated in FIG. 3B, the actual velocity of the aircraft 160 could be angularly offset from the velocity vector 312 in either direction with respect to the Z axis. That is, the angle between the Z axis and the velocity vector 312 could be greater than reported or less than reported. Accordingly, the velocity uncertainty 316 associated with the velocity vector 312 is illustrated in FIG. 3B using a dotted-line circle in the X/Z plane where each point on or within the dotted-line circle corresponds to a possible end point for the velocity vector 312. Likewise, the velocity uncertainty 318 associated with the velocity vector 314 is illustrated in FIG. 3B using a dotted-line circle where each point on or within the dotted-line circle corresponds to a possible end point for the velocity vector 314.

FIG. 3C illustrates the first position 302 and the second position 304 in a three-dimensional (3D) coordinate system including the X, Y and Z axes. In FIG. 3C, the position uncertainty 308 associated with the position 302 of the aircraft 160 is represented as a "hockey puck" shape (e.g. a cylinder). The cylinder represents horizontal position uncertainty (as in FIG. 3A) and vertical position uncertainty (as in FIG. 3B). Likewise, the position uncertainty 310 associated with the position 304 of the navigation hazard 170 is represented as a cylinder corresponding to vertical and horizontal position uncertainty. In FIG. 3C, the velocity uncertainty 316 associated with the velocity vector 312 is represented as a sphere to account for angular error in any direction as well as magnitude (or speed) error, and the velocity uncertainty 318 associated with the velocity vector 314 is represented as a sphere to account for angular error in any direction as well as magnitude (or speed) error.

FIGS. 3A, 3B, and 3C illustrate the position uncertainty 308, 310 and the velocity uncertainty 316, 318 as symmetric merely for convenience. For example, in FIG. 3B, the position uncertainty 308 is represented in a manner that may imply that the altitude of the aircraft 160 may be a particular distance above the position 302 or an equal distance below the position 302. However, in some implementations, the measurement error is not symmetric in this manner. For example, an altitude measurement sensor may be configured to err on the side of indicating a lower altitude (to ensure adequate clearance from terrain), in which case the position uncertainty may be shifted relative out of symmetry. As another example, different sensors can be used to measure vertical velocity than to measure lateral or horizontal velocity, and the different sensors can be subject to different levels of measurement error. As a result, the velocity uncertainty 316 may be elongated or compressed along the Z axis relative to along the X and Y axis leading to a somewhat non-spherical velocity uncertainty.

FIGS. 4A-4C are diagrams illustrating bounding position vectors based on the position uncertainties 308 and 310 illustrated in FIGS. 3A-3C, respectively. FIG. 4A illustrates a set of bounding vectors 300 based on horizontal position uncertainty, FIG. 4B illustrates a set of bounding vectors 350 based on vertical position uncertainty, and FIG. 4C illustrates a set of bounding vectors 370 based on horizontal and vertical position uncertainty. Each bounding vector of each of the sets of bounding vectors 300, 350, 370 extends between an offset position of the aircraft 160 and an offset position of the navigation hazard 170.

In FIG. 4A, the offset positions of the navigation hazard 170 include an offset position 408 corresponding to a horizontal offset from the position 304 in a direction away from the position 302 by a maximum value of the horizontal position uncertainty 310. The offset positions of the navigation hazard 170 also include an offset position 412 corresponding to a horizontal offset from the position 304 in a direction toward the position 302 by a maximum value of the horizontal position uncertainty 310. The offset positions of the navigation hazard 170 also include an offset position 414 and an offset position 410. The offset positions of the aircraft 160 include an offset position 402, an offset position 404, and an offset position 406. The offset position 402 of the aircraft 160 corresponds to a horizontal offset from the position 302 in a direction away from the position 304 by a maximum value of the horizontal position uncertainty 308. The offset position 414 of the navigation hazard 170 and the offset position 406 of the aircraft 160 are positioned on a line 422 that is tangent to the position uncertainty 308 (e.g., is tangent to a border of a circular range of possible positions of the aircraft 160) and is tangent to the position uncertainty 310 (e.g., is tangent to a border of a circular range of possible positions of the navigation hazard 170). The offset position 410 of the navigation hazard 170 and the offset position 404 of the aircraft 160 are positioned on a line 426 that is tangent to the position uncertainty 308 (e.g., is tangent to a border of a circular range of possible positions of the aircraft 160) and is tangent to the position uncertainty 310 (e.g., is tangent to a border of a circular range of possible positions of the navigation hazard 170).

The set of bounding vectors 300 illustrated in FIG. 4A includes a relative position vector 416 that extends between the offset position 402 and the offset position 412. Put another way, in the illustration in FIG. 4A, the relative position vector 416 extends between the left most points of the position uncertainties 308, 310. In some implementations, the direction in which the offset positions 402 and 412 are shifted from the positions 302 and 304 is related to the speeds of the aircraft 160 and the navigation hazard 170. For example, in FIG. 4A, the speed of the aircraft 160 (corresponding to the magnitude of the velocity vector 312) is greater than the speed of the navigation hazard 170 (corresponding to the magnitude of the velocity vector 314). In this example, the relative position vector 416 extends between a portion of the position uncertainty 310 of the navigation hazard 170 that is closest to the aircraft 160 (i.e., the offset position 412) to a portion of the position uncertainty 308 of the aircraft 160 that is furthest from the navigation hazard 170 (i.e., the offset position 402). However, if the speed of the aircraft 160 is less than the speed of the navigation hazard 170, the relative position vector 416 extends between a portion of the position uncertainty 310 of the navigation hazard 170 that is furthest from the aircraft 160 (i.e., the offset position 408) to a portion of the position uncertainty 308 of the aircraft 160 that is closest to the navigation hazard 170. If the velocity vectors 312 and 314 are of similar magnitude and/or if the velocity uncertainty is large for one or both of the aircraft 160 and the navigation hazard 170, it may be uncertain whether the aircraft 160 and the navigation hazard 170 is moving faster. In this situation, two versions of the relative position vector 416 can be used, where the two versions correspond to the two examples described above.

The set of bounding vectors 300 illustrated in FIG. 4A includes a relative position vector 418 that extends between the offset position 402 and the offset position 408. The relative position vector 418 extends between maximally horizontally distance points of the position uncertainties 308, 310.

The set of bounding vectors 300 illustrated in FIG. 4A also includes a relative position vector 424 that extends between the offset position 404 and the offset position 410, and includes a relative position vector 420 that extends between the offset position 406 and the offset position 414. The relative position vectors 420 and 424 correspond to maximally angularly offset portions of the position uncertainties 308, 310.

In FIG. 4B, the offset positions of the navigation hazard 170 include an offset position 432 corresponding to a vertical offset from the position 304 in a first direction along the Z axis by a maximum value of the vertical position uncertainty 310. The offset positions of the navigation hazard 170 also include an offset position 434 corresponding to a vertical offset from the position 304 in a second direction (opposite the first direction) along the Z axis by the maximum value of the vertical position uncertainty 310. Likewise, the offset positions of the aircraft include an offset position 428 corresponding to a vertical offset from the position 302 in the first direction along the Z axis by a maximum value of the vertical position uncertainty 308 and an offset position 430 corresponding to a vertical offset from the position 302 in the second direction along the Z axis by the maximum value of the vertical position uncertainty 308. The set of bounding vectors 350 illustrated in FIG. 4B includes a relative position vector 436 that extends between the offset position 428 and the offset position 434, and includes a relative position vector 438 that extends between the offset position 430 and the offset position 432.

In FIG. 4C, the offset positions of the aircraft 160 and the navigation hazard 170 are the same as the offset positions 402-414 of FIG. 4A but offset vertically as in the manner illustrated in FIG. 4B. For example, the offset positions of the aircraft 160 in FIG. 4C include an offset position 440, which corresponds to the offset position 402 vertically offset in the same manner as the offset position 428. The offset positions of the aircraft 160 in FIG. 4C also include an offset position 442 corresponding to the offset position 404 vertically offset in the same manner as the offset position 428 and an offset position 446 corresponding to the offset position 406 vertically offset in the same manner as the offset position 428. The offset positions of the aircraft 160 in FIG. 4C also include an offset position 448 corresponding to the offset position 402 vertically offset in the same manner as the offset position 430, an offset position 450 corresponding to the offset position 404 vertically offset in the same manner as the offset position 430, and an offset position 452 corresponding to the offset position 406 vertically offset in the same manner as the offset position 430.

Additionally, the offset positions of the navigation hazard 170 in FIG. 4C include an offset position 454, which corresponds to the offset position 408 vertically offset in the same manner as the offset position 432. The offset positions of the navigation hazard 170 in FIG. 4C also include an offset position 456 corresponding to the offset position 410 vertically offset in the same manner as the offset position 432, an offset position 458 corresponding to the offset position 412 vertically offset in the same manner as the offset position 432, and an offset position 460 corresponding to the offset position 414 vertically offset in the same manner as the offset position 432. The offset positions of the navigation hazard 170 in FIG. 4C also include an offset position 462 corresponding to the offset position 408 vertically offset in the same manner as the offset position 434, an offset position 464 corresponding to the offset position 410 vertically offset in the same manner as the offset position 434, an offset position 466 corresponding to the offset position 412 vertically offset in the same manner as the offset position 434, and an offset position 468 corresponding to the offset position 414 vertically offset in the same manner as the offset position 434.

The set of bounding vectors 370 illustrated in FIG. 4C includes a relative position vector 472 that extends between the offset position 448 and the offset position 458 and a relative position vector 484 that extends between the offset position 440 and the offset position 466. The set of bounding vectors 370 also includes a relative position vector 476 that extends between the offset position 448 and the offset position 454 and a relative position vector 480 that extends between the offset position 440 and the offset position 462. The set of bounding vectors 370 also includes a relative position vector 482 that extends between the offset position 442 and the offset position 464 and a relative position vector 474 that extends between the offset position 450 and the offset position 456. The set of bounding vectors 370 also includes a relative position vector 478 that extends between the offset position 446 and the offset position 468 and a relative position vector 470 that extends between the offset position 452 and the offset position 460.

FIGS. 5A and 5B are diagrams illustrating bounding velocity vectors based on the velocity uncertainties 316, 318 illustrated in FIGS. 3A and 3B, respectively. FIG. 5A illustrates vectors of a set of bounding vectors 500 based on the velocity uncertainty 316 in the horizontal plane and vectors of a set of bounding vectors 550 based on the velocity uncertainty 318 in the horizontal plane. FIG. 5B illustrates vectors of the set of bounding vectors 500 based on the velocity uncertainty 316 in the vertical plane and vectors of the set of bounding vectors 550 based on the velocity uncertainty 318 in the vertical plane.

The set of bounding vectors 500 includes a velocity vector 502 representing a maximum speed of the aircraft 160 in view of the velocity uncertainty 316 and includes a velocity vector 504 representing a minimum speed of the aircraft 160 in view of the velocity uncertainty 316. The set of bounding vectors 500 includes a velocity vector 506 (as shown in FIG. 5A), a velocity vector 510 (as shown in FIG. 5A), a velocity vector 526 (as shown in FIG. 5B), and a velocity vector 530 (as shown in FIG. 5B). Each of the velocity vectors 506, 510, 526, and 530 represent a maximum angular offset of the aircraft's velocity from the reported velocity in view of the velocity uncertainty 316. For example, the velocity vector 506 is on a line 508 that is tangent to the velocity uncertainty 316 (e.g., is tangent to a border of a circular range of possible angular directions of the velocity of the aircraft 160) resulting in a maximum angular offset (in a first direction) from the reported velocity of the aircraft 160 based on the velocity uncertainty 316. The velocity vector 510 is on a line 512 that is tangent to the velocity uncertainty 316 resulting in a maximum angular offset (in a second direction opposite the first direction) from the reported velocity of the aircraft 160 based on the velocity uncertainty 316. Likewise, in the vertical plane, the velocity vector 526 is on a line 528 that is tangent to the velocity uncertainty 316 resulting in a maximum angular offset (in a third direction) from the reported velocity of the aircraft 160 based on the velocity uncertainty 316, and the velocity vector 530 is on a line 532 that is tangent to the velocity uncertainty 316, resulting in a maximum angular offset (in a fourth direction opposite the third direction) from the reported velocity of the aircraft 160 based on the velocity uncertainty 316.

The set of bounding vectors 550 includes a velocity vector 514 representing a maximum speed of the navigation hazard 170 in view of the velocity uncertainty 318 and includes a velocity vector 516 representing a minimum speed of the navigation hazard 170 in view of the velocity uncertainty 318. The set of bounding vectors 550 includes a velocity vector 518 (as shown in FIG. 5A), a velocity vector 522 (as shown in FIG. 5A), a velocity vector 534 (as shown in FIG. 5B), and a velocity vector 538 (as shown in FIG. 5B). Each of the velocity vectors 518, 522, 534, and 538 represent a maximum angular offset of the navigation hazard's velocity from the reported velocity in view of the velocity uncertainty 318. For example, the velocity vector 518 is on a line 520 that is tangent to the velocity uncertainty 318 resulting in a maximum angular offset (in a first direction) from the reported velocity of the navigation hazard 170 based on the velocity uncertainty 318, and the velocity vector 522 is on a line 524 that is tangent to the velocity uncertainty 318 resulting in a maximum angular offset (in a second direction opposite the first direction) from the reported velocity of the navigation hazard 170 based on the velocity uncertainty 318. Likewise, in the vertical plane, the velocity vector 534 is on a line 536 that is tangent to the velocity uncertainty 318 resulting in a maximum angular offset (in a third direction) from the reported velocity of the navigation hazard 170 based on the velocity uncertainty 318, and the velocity vector 538 is on a line 540 that is tangent to the velocity uncertainty 318 resulting in a maximum angular offset (in a fourth direction opposite the third direction) from the reported velocity of the navigation hazard 170 based on the velocity uncertainty 318.

Figure 6A:
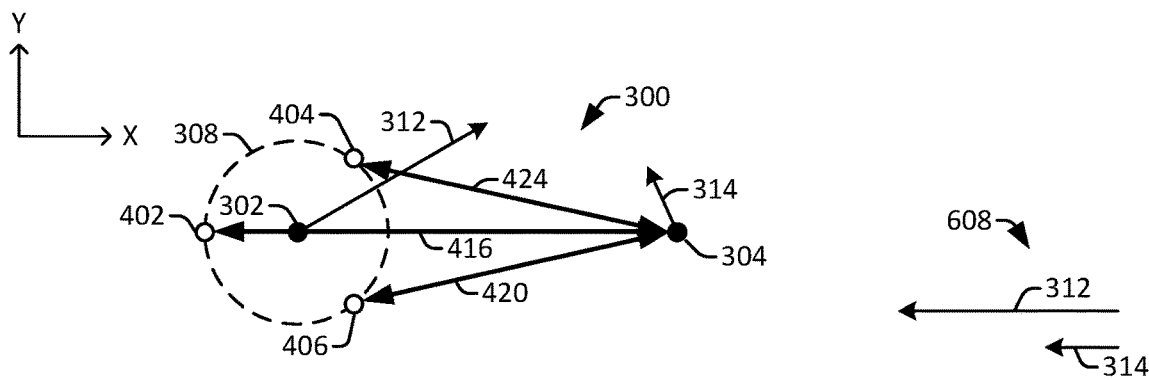
FIGS. 6A, 6B, and 6C illustrate aspects of a method of generating data describing an Apollonius circle based on velocity vectors, a relative position vector, and position uncertainty.
Figure 6B:
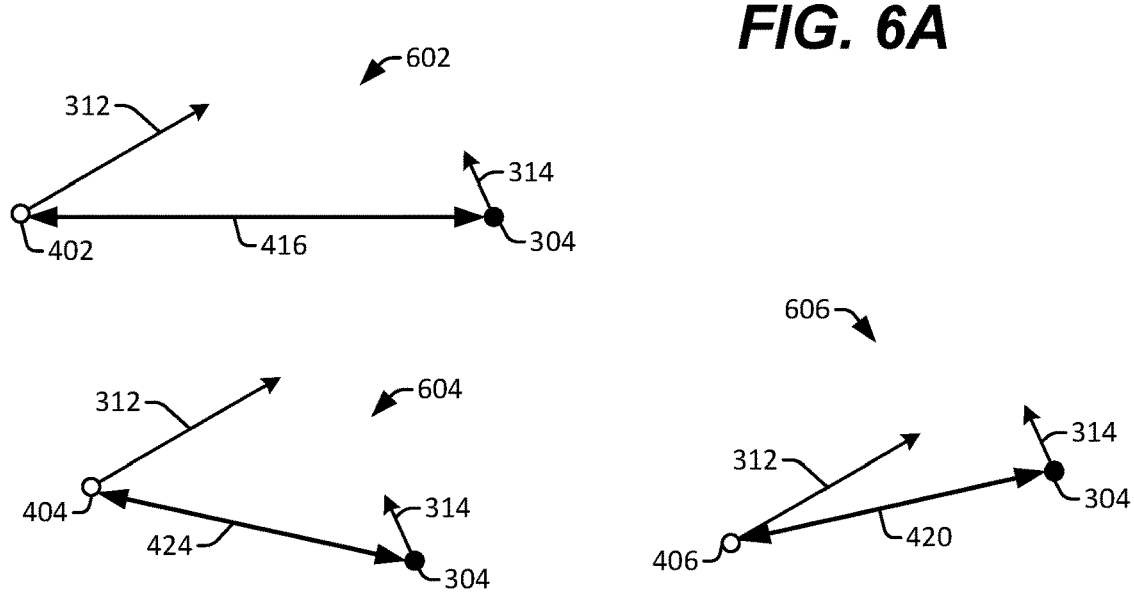
Figure 6C:
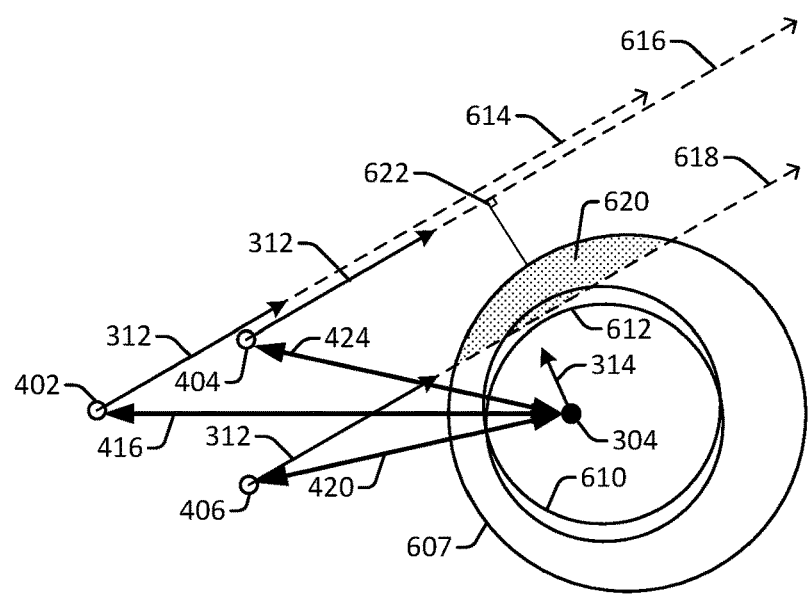

FIGS. 6A-6C illustrate an example of using the bounding vectors described with reference to FIG. 4A to identify a region of interest 620. The example illustrated in FIGS. 6A-6C represents a simplified circumstance in which the only uncertainty accounted for is with respect to the position 302. That is, only the horizontal position of the aircraft 160 or the horizontal position of the navigation hazard 170 is uncertain. FIGS. 6A-6C thus represent a one-sided position uncertainty situation in two dimensions with no velocity uncertainty.

The example illustrated in FIGS. 6A-6C may apply, for example, to a situation in which a velocity sensor that reported the velocity vector 312, a velocity sensor that reported the velocity vector 314, an altitude sensor that reported a vertical component of the position 302, an altitude sensor that reported a vertical component of the position 304, and a position sensor that reported horizontal components of the position 304 are much more reliable than the position sensor that reported horizontal components of the position 302. To illustrate, the position 302 can be based on dead reckoning or visual estimation from a pilot while the other values are reported from accurate sensors systems, such as global position systems, radar, lidar, etc. As another example, the relative positions of the aircraft 160 and the navigation hazard 170 can be determined using a return signal of a ranging and direction system (e.g., radar or lidar) of the aircraft 160. In this situation, the absolute position of the aircraft 160 may not be known (or may not be used). Rather, the aircraft 160 is treated as an origin point of a coordinate system and the position uncertainty 308 is related to the relative position of the navigation hazard 170 with respect to the aircraft 160 and is thus one-sided. As yet another example, the process described with reference to FIGS. 6A-6C can be performed twice to approximate two-sided position uncertainty. To illustrate, the process can be performed once to account for the position uncertainty 308 associated with the position 302 and another time to account for the position uncertainty 310 associated with the position 304. Applying the single position uncertainty process twice does not account for extremes in angle and/or distance that may occur when considering position uncertainty for both the aircraft 160 and the navigation hazard 170 together. For example, the results from possible relative position vectors 424, 418 or 420, as shown in FIG. 4A, may not be achieved.

Under the circumstances illustrated in FIG. 6A, the set of bounding (position) vectors 300 includes the relative position vector 424 between the offset position 404 and the position 304, the relative position vector 416 between the offset position 402 and the position 304, and the relative position vector 420 between the offset position 406 and the position 304. No velocity uncertainty is considered, so the velocity vectors 312, 314 are used rather than bounding velocity vectors. A comparison 608 of the magnitudes of the velocity vectors 312 and 314 indicates that the velocity vector 312 corresponds to a speed that is approximately three times the speed represented by the velocity vector 314. Stated another way, a speed ratio of the velocity vectors 312, 314 is approximately 3:1.

FIG. 6B illustrates cases 602, 604, 606 to be evaluated based on the bounding vectors of FIG. 6A. A case 602 is based on the relative position vector 416 and corresponds to the aircraft 160 being located at the offset position 402 and having the velocity vector 312 and the navigation hazard 170 being located at the position 304 and having the velocity vector 314. A case 604 is based on the relative position vector 424 and corresponds to the aircraft 160 being located at the offset position 404 and having the velocity vector 312 and the navigation hazard 170 being located at the position 304 and having the velocity vector 314. A case 606 is based on the relative position vector 420 and corresponds to the aircraft 160 being located at the offset position 406 and having the velocity vector 312 and the navigation hazard 170 being located at the position 304 and having the velocity vector 314.

Each of the cases 602, 604, 606 is used to generate an Apollonius circle. FIG. 6C illustrates the resulting Apollonius circles 607, 610, 612. An Apollonius circle 607 is determined based on the relative position vector 416 and a speed ratio of the velocity vectors 312 and 314. An Apollonius circle 610 is determined based on the relative position vector 424 and a speed ratio of the velocity vectors 312 and 314. An Apollonius circle 612 is determined based on the relative position vector 420 and a speed ratio of the velocity vectors 312 and 314. Each of the Apollonius circles 607, 610, 612 is formed (or bounded) by a plurality of candidate intersection points of the aircraft 160 and the navigation hazard 170 based on the respective relative position vector and the velocity vectors. That is, accounting for just current position and speed, the aircraft 160 and the navigation hazard 170 could intersect at any point on an Apollonius circles 607, 610, 612.

Since the Apollonius circles 607, 610, 612 are determined based on the relative position vectors 416, 420, 424 and the speed ratio of the velocity vectors 312, 314, the Apollonius circles 607, 610, 612 do not account for directionality of the velocity vectors 312, 314. In FIG. 6C, the velocity vector 312 is extended (as indicated by lines 614, 616, and 618) to identify intersections with the Apollonius circles 607, 610, 612, points of closest approach to the Apollonius circles 607, 610, 612, or both. Each of the lines 614, 616, 618 can intersect an Apollonius circle 607, 610, 612 twice (corresponding to entering and leaving the circle), once (corresponding to being tangent to the circle), or not at all.

If a line 614, 616, 618 intersects an Apollonius circle 607, 610, 612 at two points, the region of interest 620 corresponds to (or includes) a region between the line 614, 616, 618 and the boundary of the Apollonius circle 607, 610, 612. For example, in FIG. 6C, the region of interest 620 corresponds to or includes the shaded area between the line 618 and the boundary of the circle 610. In some implementations, the region of interest 620 can also include the shaded area between the line 618 and the boundary of the circle 607. In some implementations, the region of interest 620 can also include an area extending some threshold distance (e.g., a separation distance) around the area between the line 618 and the boundary of the circle 610 or 607.

If more than one line 614, 616, 618 intersects an Apollonius circle 607, 610, 612 at two points, the region of interest 620 corresponds to (or includes) a region between at least two of the lines 614, 616, 618 and the boundary of the Apollonius circle 607, 610, 612. For example, when both of the lines 616 and 618 intersect the Apollonius circle 607 at two points, the region of interest 620 corresponds to or includes the region between the line 616 and the line 618 that is enclosed within the Apollonius circle 607 (i.e., a region bounded by the lines 616, 618 and the Apollonius circle 607).

If a line 614, 616, 618 intersects an Apollonius circle 607, 610, 612 at one point, the region of interest 620 corresponds to or includes the intersection point(s). In some implementations, the region of interest 620 corresponds to or includes a region extending a threshold distance (e.g., the separation distance) around the intersection point(s). In other implementations, the region of interest 620 corresponds to or includes a region between the line 614, 616, 618 and the boundary of the circle 607, 610, 612. If a line 614, 616, 618 does not intersect an Apollonius circle 607, 610, 612, the points of closest approach corresponding to the aircraft 160 and the navigation hazard 170 can be determined for each case 602, 604, and 606. If the distance between the aircraft 160 and the navigation hazard 170 at the point of closest approach is greater than (or greater than or equal to) a threshold distance (e.g., the separation distance) no region of interest is identified. If the distance between the aircraft 160 and the navigation hazard 170 at the point of closest approach is less than (or less than or equal to) the threshold distance (e.g., the separation distance) the region of interest is an area around and including the point of closest approach corresponding to the aircraft 160, the point of closest approach corresponding to the navigation hazard 170, or both.

Figure 7A:
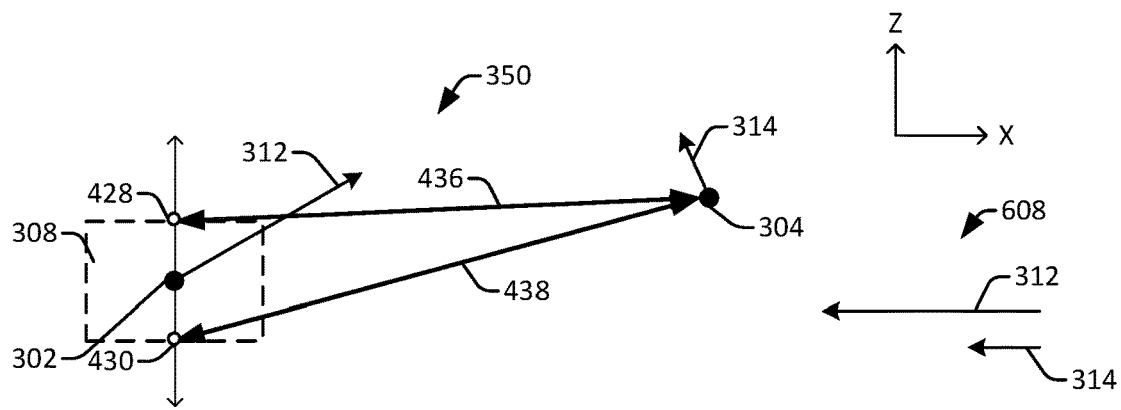
FIGS. 7A, 7B, and 7C illustrate aspects of a method of generating data describing an Apollonius circle based on velocity vectors, a relative position vector, and position uncertainty.
Figure 7B:
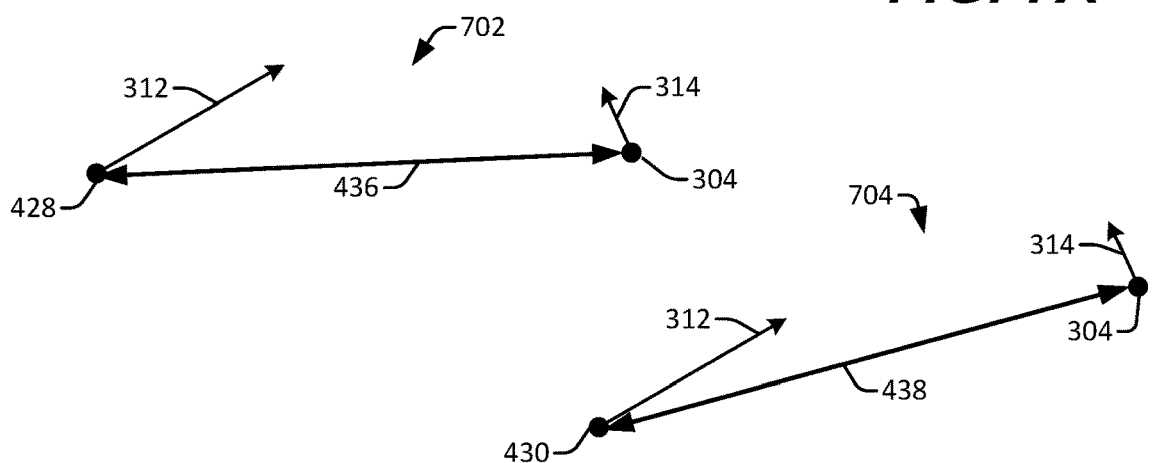
Figure 7C:
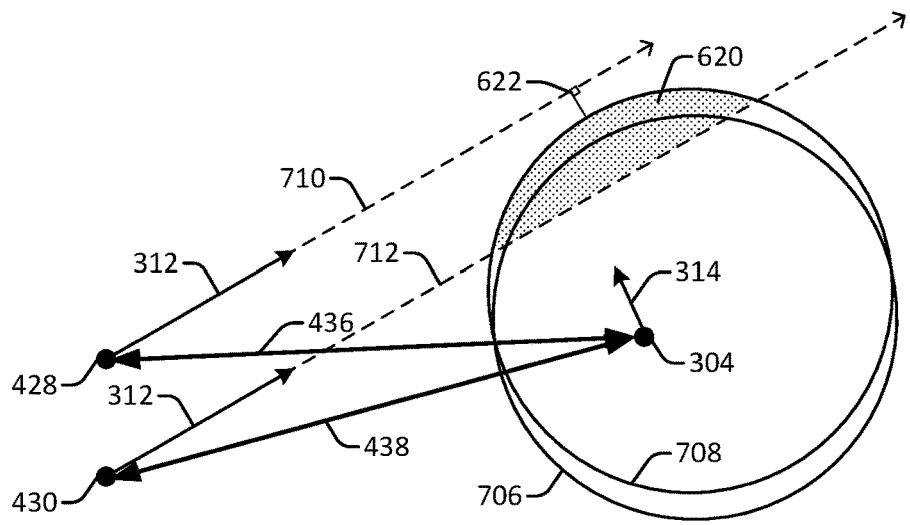

FIGS. 7A-7C illustrate an example of using the bounding vectors described with reference to FIG. 4B to identify a region of interest 620. The example illustrated in FIGS. 7A-7C represent a simplified circumstance in which only the vertical position of the aircraft 160 or the vertical position of the navigation hazard 170 is uncertain. Thus, FIGS. 7A-7C represent a one-sided position uncertainty situation in two dimensions with no velocity uncertainty, and are conceptually identical to the example described with reference to FIGS. 6A-6C except for using vertical position uncertainty rather than horizontal position uncertainty.

Under the circumstances illustrated in FIG. 7A, the set of bounding vectors 350 includes the relative position vector 436 between the offset position 428 and the position 304 and the relative position vector 438 between the offset position 430 and the position 304. No velocity uncertainty is considered, so the velocity vectors 312, 314 are used rather than bounding velocity vectors. A comparison 608 of the magnitudes of the velocity vectors 312 and 314 indicates that the velocity vector 312 corresponds to a speed that is approximately three times the speed represented by the velocity vector 314. Stated another way, a speed ratio of the velocity vectors 312, 314 is approximately 3:1.

FIG. 7B illustrates cases 702, 704 to be evaluated based on the bounding vectors of FIG. 7A. A case 702 is based on the relative position vector 436 and corresponds to the aircraft 160 being located at the offset position 428 and having the velocity vector 312 and the navigation hazard 170 being located at the position 304 and having the velocity vector 314. A case 704 is based on the relative position vector 438 and corresponds to the aircraft 160 being located at the offset position 430 and having the velocity vector 312 and the navigation hazard 170 being located at the position 304 and having the velocity vector 314.

Each of the cases 702, 704 is used to generate an Apollonius circle. FIG. 7C illustrates the resulting Apollonius circles 706, 708. An Apollonius circle 706 is determined based on the relative position vector 436 and a speed ratio of the velocity vectors 312 and 314, and an Apollonius circle 708 is determined based on the relative position vector 438 and a speed ratio of the velocity vectors 312 and 314.

In FIG. 7C, the velocity vector 312 is extended (as indicated by lines 710 and 712) to identify intersections with the Apollonius circles 706, 708, points of closest approach 622 to the Apollonius circles 706, 708, or both. The intersections of the lines 710, 712 with the Apollonius circles 706, 708 or the points of closest approach to the Apollonius circles 706, 708 are used to determine the region of interest 620 in an analogous manner as described with reference to FIG. 6C.

FIGS. 8A-8C illustrate an example of using the bounding vectors described with reference to FIG. 5A to identify a region of interest 620. The example illustrated in FIGS. 8A-8C represents a simplified circumstance in which only the horizontal velocity of the aircraft 160 or the horizontal velocity of the navigation hazard 170 is uncertain. Thus, FIGS. 8A-8C represent a one-sided velocity uncertainty situation in two dimensions with no position uncertainty.

Under the circumstances illustrated in FIG. 8A, the position vector 306 describes the distance and direction between the position 302 and the position 304. The velocity of the navigation hazard 170 is indicated by the velocity vector 314, and the velocity of the aircraft 160 is associated with velocity uncertainty bounded by the set of velocity vectors 500. The set of velocity vectors 500 includes the velocity vector 502, the velocity vector 504, the velocity vector 506, and the velocity vector 510. The comparison 608 illustrates the magnitudes of the velocity vectors 314, 502, 504, 506, and 510. The velocity vectors 506 and 510 are symmetrically offset from the reported velocity resulting in the velocity vectors 506 and 510 having the same magnitude but different directions. As illustrated in the comparison 608, the velocity vector 502 corresponds to a speed that is approximately three times the speed represented by the velocity vector 314 (e.g., a speed ratio of about 3:1), the velocity vectors 506 and 510 correspond to speeds that are approximately two times the speed represented by the velocity vector 314 (e.g., a speed ratio of about 2:1), and the velocity vector 504 corresponds to a speed that is approximately one and a half times the speed represented by the velocity vector 314 (e.g. a speed ratio of about 1.5:1).

FIG. 8B illustrates cases 802, 804, 806, 808 to be evaluated based on the bounding vectors of FIG. 8A. A case 802 is based on the relative position vector 306, the velocity vector 502, and the velocity vector 314. A case 804 is based on the relative position vector 306, the velocity vector 504, and the velocity vector 314. A case 806 is based on the relative position vector 306, the velocity vector 510, and the velocity vector 314. A case 808 is based on the relative position vector 306, the velocity vector 506, and the velocity vector 314.

Each of the cases 802, 804, 806, 808 is used to generate an Apollonius circle. As described above, the Apollonius circles are based on the positions of the aircraft 160 and the navigation hazard 170 and a speed ratio of the aircraft 160 and the navigation hazard 170, without regard for the direction of the velocity vectors 500. Since, the speed ratio based on the velocity vector 506 and the velocity vector 314 is equal to the velocity vector 510 and the velocity vector 314, the Apollonius circle based on the velocity vector 506 and the velocity vector 314 and the Apollonius circle based on the velocity vector 510 and the velocity vector 314 are identical.

FIG. 8C illustrates the resulting Apollonius circles 810, 812, 814. An Apollonius circle 810 is determined based on the case 802, an Apollonius circle 812 is determined based on the cases 806 and/or 808, and an Apollonius circle 814 is determined based on the case 804. In FIG. 8C, the velocity vectors 502, 504, 506, 510 are extended (as indicated by lines 816, 818, and 820) to identify intersections with the Apollonius circles 810, 812, 814, points of closest approach, or both, to determine the region of interest 620. Similarly, when only the vertical velocity of the aircraft 160 or the vertical velocity of the navigation hazard 170 is uncertain, the methods described in FIGS. 8A-8C can be used to identify a region of interest 620 based on the bounding vectors described with reference to FIG. 5A. For example, for aircraft at similar positions but different altitudes horizontal velocity uncertainty may be omitted.

FIGS. 9A-9C illustrate an example of using the bounding vectors described with reference to FIG. 4A to identify a region of interest 620. The example illustrated in FIGS. 9A-9C represents a simplified circumstance which accounts for two-dimensional position uncertainty. That is, the horizontal position of the aircraft 160 and the horizontal position of the navigation hazard 170 are uncertain. Thus, FIGS. 9A-9C represent a two-sided position uncertainty situation in two dimensions with no velocity uncertainty.

Under the circumstances illustrated in FIG. 9A, the set of bounding (position) vectors 300 includes the relative position vector 424 between the offset position 404 and the offset position 410, the relative position vector 416 between the offset position 402 and the offset position 412, the relative position vector 418 between the offset position 402 and the offset position 408, and the relative position vector 420 between the offset position 406 and the offset position 414. No velocity uncertainty is considered, so the velocity vectors 312, 314 are used rather than bounding velocity vectors. The comparison 608 of the magnitudes of the velocity vectors 312 and 314 indicates that the velocity vector 312 corresponds to a speed that is approximately three times the speed represented by the velocity vector 314. Stated another way, a speed ratio of the velocity vectors 312, 314 is approximately 3:1.

FIG. 9B illustrates cases 902, 904, 906, and 908 to be evaluated based on the bounding vectors of FIG. 9A. The case 902 is based on the relative position vector 418 and corresponds to the aircraft 160 being located at the offset position 402 and having the velocity vector 312 and the navigation hazard 170 being located at the position 408 and having the velocity vector 314. The case 904 is based on the relative position vector 416 and corresponds to the aircraft 160 being located at the offset position 402 and having the velocity vector 312 and the navigation hazard 170 being located at the position 412 and having the velocity vector 314. The case 906 is based on the relative position vector 424 and corresponds to the aircraft 160 being located at the offset position 404 and having the velocity vector 312 and the navigation hazard 170 being located at the position 410 and having the velocity vector 314. The case 908 is based on the relative position vector 420 and corresponds to the aircraft 160 being located at the offset position 406 and having the velocity vector 312 and the navigation hazard 170 being located at the position 414 and having the velocity vector 314.

Each of the cases 902, 904, 906, 908 is used to generate an Apollonius circle. FIG. 9C illustrates the resulting Apollonius circles 910, 912, 914, 916. The Apollonius circle 910 is determined based on the case 906, the Apollonius circle 912 is determined based on the case 904, the Apollonius circle 914 is determined based on the case 908, and the Apollonius circle 916 is determined based on the case 902.

In FIG. 9C, the velocity vector 312 is extended (as indicated by lines 918, 920, and 922) to identify intersections with the Apollonius circles 910, 912, 914, 916, points of closest approach 622 to the Apollonius circles 910, 912, 914, 916, or both, to identify the region of interest 620.

FIGS. 10A and 10B illustrate an example of using both the bounding vectors described with reference to FIG. 4A and the bounding vectors described with reference to FIG. 5A. The example illustrated in FIGS. 10A and 10B represents a simplified circumstance which accounts for two-dimensional position uncertainty and two-dimensional velocity uncertainty.

Under the circumstances illustrated in FIG. 10A, the set of bounding vectors 300 is the same as described with reference to FIG. 9A, and the sets of velocity vectors 500, 550 are the same as described with reference to FIG. 5A. The comparison 608 of the magnitudes of the velocity vectors 502, 504, 506, and 510 and the velocity vectors 514, 516, 518, and 522 illustrates the various speed ratios.

FIG. 10B illustrates cases 1002, 1004, 1006, and 1008 to be evaluated based on the bounding vectors of FIG. 10A. The cases 1002, 1004, 1006, and 1008 are illustrated in a simplified form relative to cases illustrated in FIGS. 6B, 7B, 8B, and 9B for ease of illustration. Each of the cases 1002, 1004, 1006, 1008 can be used to generate an Apollonius circle. As illustrated in the comparison 608, nine distinct speed ratios can be determined based on the velocity vectors 502, 504, 506, 510, 514, 516, 518, and 522. Accordingly, each of the cases 1002, 1004, 1006, 1008 can generate nine Apollonius circles, resulting in a total of thirty-six Apollonius circles to represent the four cases 1002, 1004, 1006, 1008 in FIG. 10B.

It is expected that identifying regions of interest based on the thirty-six Apollonius circles corresponding to FIGS. 10A and 10B will generally use fewer processing resources that the brute-force simulation (e.g., the DAIDALUS tool) described above. Further, identifying regions of interest based on the thirty-six Apollonius circles of FIGS. 10A and 10B is a well-defined problem (e.g., a solution results based on a predictable, discrete number of calculations) and is well suited to parallel processing (e.g., each Apollonius circle can be determined using a corresponding processing thread). Further, rather than performing calculations based on all thirty-six Apollonius circles, a reduced set of the calculations can be performed (e.g., to generate and evaluate fewer than thirty-six Apollonius circles) to generate a coarse estimate of the regions of interest. If the coarse estimate indicates that it may be appropriate, the remaining Apollonius circles of the all thirty-six Apollonius circles can be generated and evaluated as a fine estimate of the regions of interest. Evaluation of the thirty-six Apollonius circles includes identifying points of intersection, points of closest approach, or both, for each velocity vector of the set of velocity vectors 500, each velocity vector of the set of velocity vectors 550, or both.

FIGS. 11A and 11B illustrate an example of a simplified approach (e.g., to generate the coarse estimate of the regions of interest) based on the two-sided position uncertainty and two-sided velocity uncertainty of FIGS. 10A and 10B. In FIG. 11A, all of the bounding (position) vectors 300 described with reference to FIG. 10A are used. However, only a subset 1100 of the velocity vectors 500 and a subset 1150 of the velocity vectors 550 are used. The subset 1150 of the velocity vectors 550 includes the velocity vector 514 (e.g., the maximum magnitude of the velocity of the navigation hazard 170) and the velocity vector 516 (e.g., the minimum magnitude of the velocity of the navigation hazard 170). The subset 1100 of the velocity vectors 500 includes the velocity vector 510 (e.g., a maximum angular offset of the velocity of the aircraft 160). FIG. 11B illustrates the various cases that result from using the simplified set of vectors illustrated in FIG. 11A. The simplified set of vectors corresponds to two speed ratios. Accordingly, the cases illustrated in FIG. 11B can be used to generate eight Apollonius circles 1102, 1104, 1106, 1108, 1110, 1112, 1114, and 1116, as illustrated in FIG. 11C, which can be used to identify regions of interest as previously described. Evaluation of the eight Apollonius circles includes identifying points of intersection, points of closest approach, or both, for the velocity vector 510, each velocity vectors 514, 516, or both.

In a particular implementation, the simplified approach described with reference to FIGS. 11A-11C can be repeated by considering the velocity vectors 502 and 504 (e.g., the maximum magnitude of the velocity of the aircraft 160 and the minimum magnitude of the velocity of the aircraft 160) and the velocity vector 518 (e.g., the maximum angular offset of the velocity of the navigation hazard 170). Repeating the simplified approach in this manner results in an additional eight Apollonius circles similar to the Apollonius circles 1102, 1104, 1106, 1108, 1110, 1112, 1114, and 1116, of FIG. 11C. In some implementations, the resulting sixteen Apollonius circles are used to generate a coarse estimate of the region of interest.

FIGS. 12A and 12B illustrate an example of using the bounding vectors described with reference to FIG. 4C, the bounding vectors described with reference to FIG. 5A, and the bounding vectors described with reference to FIG. 5B. Thus, the example illustrated in FIGS. 12A and 12B represent a circumstance which accounts for three-dimensional position uncertainty and three-dimensional velocity uncertainty for both the aircraft 160 and the navigation hazard 170. The set of velocity vectors 500 includes six velocity vectors, and the set of velocity vectors 550 includes six velocity vectors. In a particular implementation, the velocity uncertainty 316 for the set of velocity vectors 500 is symmetrical in each angularly offset direction resulting in all of the angularly offset velocities of the set of velocity vectors 500 having the same magnitude. Likewise, the velocity uncertainty 318 for the set of velocity vectors 550 is symmetrical in each angularly offset direction resulting in all of the angularly offset velocities of the set of velocity vectors 550 having the same magnitude. As a result, the set of velocity vectors 500 and the set of velocity vectors 550 result in nine distinct speed ratios.

FIG. 12B illustrates the various cases to be evaluated based on the bounding vectors of FIG. 12A. The cases of FIG. 12B are illustrated in a simplified form relative to cases illustrated in FIGS. 6B, 7B, 8B, 9B, and 10B for ease of illustration. Each of the cases can be used to generate an Apollonius sphere. The set of position vectors 370 includes eight relative position vectors, each of which can be used to form nine distinct Apollonius spheres, one per speed ratio of the nine distinct speed ratios associated with the sets of velocity vectors 500 and 550. Accordingly, the cases of FIG. 12B can be used to generate seventy-two Apollonius spheres. Evaluation of the seventy-two Apollonius spheres includes identifying points of intersection, points of closest approach, or both, for each instance of each velocity vector of the set of velocity vectors 500, each instance of each velocity vector of the set of velocity vectors 550, or both.

FIG. 13A illustrates an example of a simplified approach (e.g., to generate a coarse estimate of the regions of interest) based on the two-sided position uncertainty in three dimensions and two-sided velocity uncertainty in three dimensions of FIGS. 12A and 12B. In FIG. 13A, all of the bounding position vectors 370 described with reference to FIG. 12A are used. However, only a subset 1100 of the velocity vectors 500 and a subset 1150 of the velocity vectors 550 are used. The subset 1150 of the velocity vectors 550 includes the velocity vector 514 (e.g., the maximum magnitude of the velocity of the navigation hazard 170) and the velocity vector 516 (e.g., the minimum magnitude of the velocity of the navigation hazard 170). The subset 1100 of the velocity vectors 500 includes the velocity vector 510 (e.g., a maximum angular offset of the velocity of the aircraft 160). The subset 1100 of the velocity vectors 500 and the subset 1150 of the velocity vectors 550 result in two distinct speed ratios. Thus, the simplified approach illustrated in FIG. 13A can be used to generate sixteen different Apollonius spheres (based on eight relative position vectors and two speed ratios each). FIG. 13B illustrates reversing the simplified approach illustrated in FIG. 13A. Thus, the example illustrated in FIG. 13B can be used to generate sixteen additional Apollonius spheres. The sixteen Apollonius spheres generated based on the example illustrated in FIG. 13A, the sixteen Apollonius spheres generated based on the example illustrated in FIG. 13B, or both, can be used to generate a coarse estimate of the region of interest.

Generally, identifying regions of interest based on the Apollonius spheres based on FIGS. 13A and 13B uses fewer processing resources than the brute-force simulation (e.g., the DAIDALUS tool) described above. Further, identifying regions of interest based on the Apollonius spheres based on FIGS. 13A and 13B is a well-defined problem (e.g., a solution results based on a predictable, discrete number of calculations) and is well suited to parallel processing (e.g., each Apollonius sphere can be determined using a corresponding processing thread). If the coarse estimate indicates that it may be appropriate, the full set of Apollonius spheres based on FIG. 12B be generated and evaluated as a fine estimate of the regions of interest.

Figure 14:
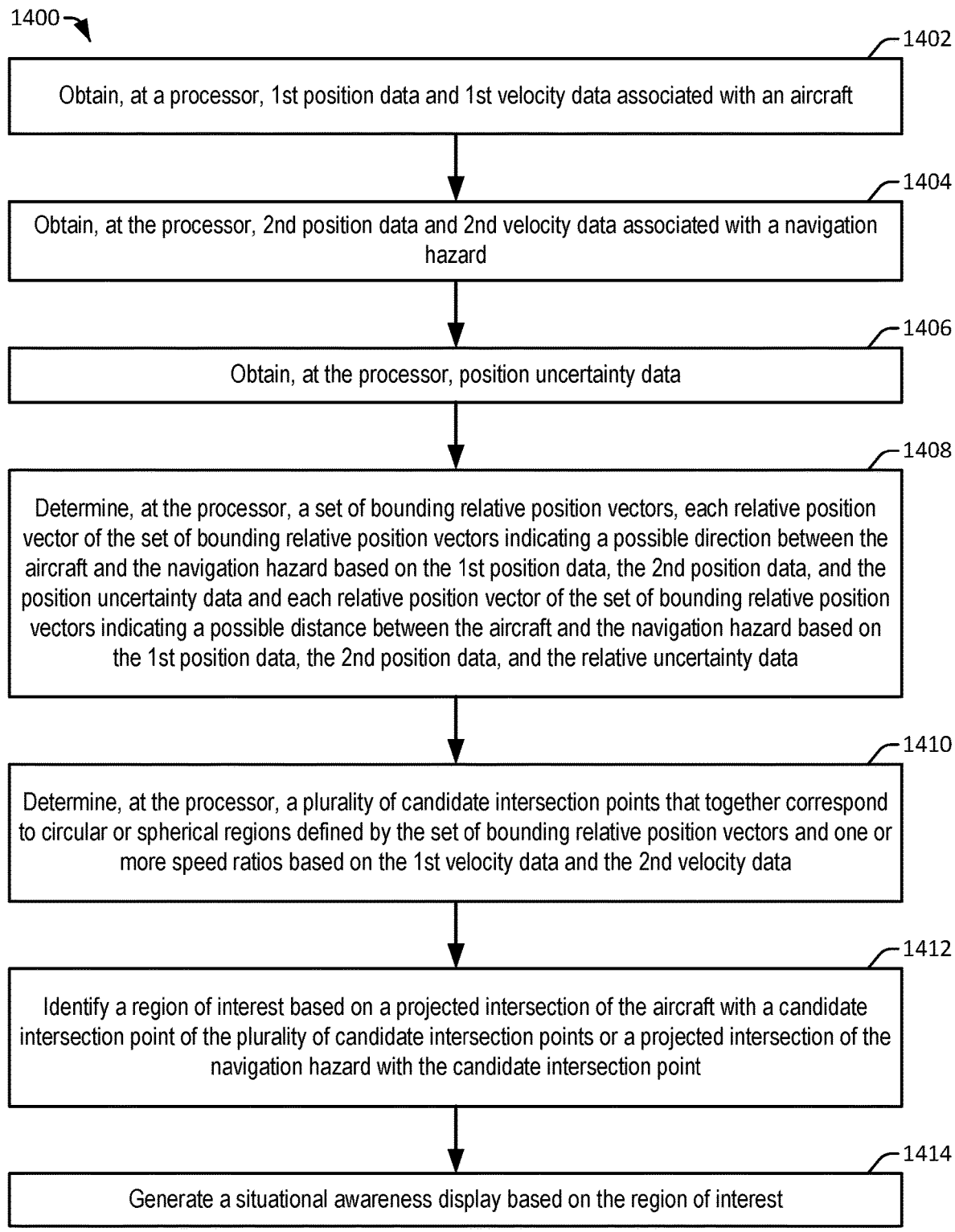
FIG. 14 is a flow chart that illustrates an example of a method of generating a situational awareness display.

FIG. 14 is a flow chart that illustrates an example of a method 1400 of generating a situational awareness display, such as the display 150 of one or more of FIG. 1 and FIG. 2B. The method 1400 can be performed by the aircraft flight information system 104 of FIG. 1. For example, the processor(s) 124 of the aircraft flight information system 104 can execute the instructions 132 to perform operations of the method 1400.

The method 1400 includes, at 1402, obtaining first position data and first velocity data associated with an aircraft, at 1404, obtaining second position data and second velocity data associated with a navigation hazard, and, at 1406, obtaining position uncertainty data. For example, the first position data, the second position data, and the position uncertainty data can be obtained from the airspace data 114 or the position and velocity data 144 of FIG. 1. The position uncertainty data includes first position uncertainty data indicating uncertainty in the first position data, second position uncertainty data indicating uncertainty in the second position data, or both. For example, the position uncertainty data can indicate a first horizontal position uncertainty for a first position of the aircraft and a second horizontal position uncertainty for a second position of the navigation hazard.

The method 1400 includes, at 1408, determining a set of bounding relative position vectors. Each relative position vector of the set of bounding relative position vectors indicates a possible direction between the aircraft and the navigation hazard based on the first position data, the second position data, and the position uncertainty data. Each relative position vector of the set of bounding relative position vectors indicates a possible distance between the aircraft and the navigation hazard based on the first position data, the second position data, and the relative position uncertainty data. For example, the set of bounding relative position vectors can include or correspond to the bounding vectors 300, 350 or 370.

In some implementations, the set of bounding relative position vectors are based on offset positions that indicate at least horizontal displacement. In such implementations, the set of bounding relative position vectors includes at least a first relative position vector indicating a first distance and a first direction between a first offset position of the aircraft and a first offset position of the navigation hazard. The first offset position of the aircraft corresponds to a horizontal offset from the first position, in a direction away from the second position, by a maximum value of the first horizontal position uncertainty. To illustrate, the first offset position of the aircraft corresponds to the offset position 402 of FIG. 4A. The first offset position of the navigation hazard corresponds to a horizontal offset from the second position, in a direction away from the first position, by a maximum value of the second horizontal position uncertainty. To illustrate, the first offset position of the navigation hazard corresponds to the offset position 408 of FIG. 4A.

In a particular implementation, the set of bounding relative position vectors also includes at least a second relative position vector indicating a second distance and a second direction between the first offset position of the aircraft and a second offset position of the navigation hazard. The second offset position of the navigation hazard corresponds to a horizontal offset from the second position, in a direction toward the first position, by a maximum value of the second horizontal position uncertainty. To illustrate, the second offset position of the navigation hazard corresponds to the offset position 412 of FIG. 4A.

In some implementations, the relative position uncertainty data further indicates a first vertical position uncertainty for the first position of the aircraft and a second vertical position uncertainty for the second position of the navigation hazard. In such implementations, the first offset position of the aircraft further corresponds to a vertical offset from the first position, in a first vertical direction, by a maximum value of the first vertical position uncertainty and the second offset position of the navigation hazard corresponds to a vertical offset from the second position, in the second vertical direction opposite the first vertical direction, by the maximum value of the second vertical position uncertainty. To illustrate, the first offset position of the aircraft corresponds to the offset position 440 of FIG. 4C and the second offset position of the navigation hazard corresponds to the offset position 466. Alternatively, or in addition, the first offset position of the aircraft corresponds to the offset position 448 of FIG. 4C and the second offset position of the navigation hazard corresponds to the offset position 458.

Further, in such implementations, the first offset position of the navigation hazard can correspond to a vertical offset from the second position, in the second vertical direction, by a maximum value of the second vertical position uncertainty. To illustrate, the first offset position of the aircraft corresponds to the offset position 440 of FIG. 4C and the first offset position of the navigation hazard corresponds to the offset position 462. Alternatively, or in addition, the first offset position of the aircraft corresponds to the offset position 448 of FIG. 4C and the second offset position of the navigation hazard corresponds to the offset position 454.

In some implementations, the first horizontal position uncertainty for the first position describes a first circular range of possible positions of the aircraft in a horizontal plane, such as the horizontal position uncertainty 308 of FIG. 3A. Additionally, or in the alternative, the second horizontal position uncertainty for the second position describes a second circular range of possible positions of the navigation hazard in the horizontal plane such as the horizontal position uncertainty 310 of FIG. 3A. In such implementations, the set of bounding relative position vectors can include a third relative position vector indicating a third distance and a third direction between a third offset position of the aircraft and a third offset position of the navigation hazard. The third offset position of the aircraft corresponds to a horizontal offset from the first position by the maximum value of the first horizontal position uncertainty, and the third offset position of the navigation hazard corresponds to a horizontal offset from the second position by the maximum value of the second horizontal position uncertainty, where the third offset position of the aircraft and the third offset position of the navigation hazard are positioned on a line that is tangent to a border of the first circular range of possible positions of the aircraft and is tangent to a border of the second circular range of possible positions of the navigation hazard. For example, the third offset position of the aircraft corresponds to the offset position 404 and the third offset position of the navigation hazard corresponds to the offset position 410. In another example, the third offset position of the aircraft corresponds to the offset position 406 and the third offset position of the navigation hazard corresponds to the offset position 414.

In some such implementations, the relative position uncertainty data further indicates a first vertical position uncertainty for a first position of the aircraft and a second vertical position uncertainty for a second position of the navigation hazard. In a particular implementation, the third offset position of the aircraft further corresponds to a vertical offset from the first position, in a first vertical direction, by a maximum value of the first vertical position uncertainty, and the third offset position of the navigation hazard further corresponds to a vertical offset from the second position, in a second vertical direction opposite the first vertical direction, by a maximum value of the second vertical position uncertainty. For example, the third offset position of the aircraft corresponds to the offset position 442 and the third offset position of the navigation hazard corresponds to the offset position 464. In another example, the third offset position of the aircraft corresponds to the offset position 450 and the third offset position of the navigation hazard corresponds to the offset position 456. In yet another example, the third offset position of the aircraft corresponds to the offset position 446 and the third offset position of the navigation hazard corresponds to the offset position 468. In another example, the third offset position of the aircraft corresponds to the offset position 452 and the third offset position of the navigation hazard corresponds to the offset position 460.

In some implementations, the offset positions indicate at least vertical displacement. In such implementations, the relative position uncertainty data indicates a first vertical position uncertainty for the first position and a second vertical position uncertainty for the second position of the navigation hazard. For example, the set of bounding relative position vectors includes a first relative position vector, the first relative position vector indicating a first distance and a first direction between a first offset position of the aircraft and a first offset position of the navigation hazard, where the first offset position of the aircraft corresponds to a vertical offset from the first position, in a first vertical direction, by a maximum value of the first vertical position uncertainty, and the first offset position of the navigation hazard corresponds to a vertical offset from the second position, in a second vertical direction opposite the first vertical direction, by a maximum value of the second vertical position uncertainty. To illustrate, the first offset position of the aircraft can correspond to the offset position 428 and the first offset position of the navigation hazard can correspond to the offset position 434.

In some implementations, the set of bounding relative position vectors also includes a second relative position vector indicating a second distance and a second direction between a second offset position of the aircraft and a second offset position of the navigation hazard. The second offset position of the aircraft can correspond to a vertical offset from the first position, in the second vertical direction, by a maximum value of the first vertical position uncertainty, and the second offset position of the navigation hazard can correspond to a vertical offset from the second position, in the first direction, by a maximum value of the second vertical position uncertainty. To illustrate, the second offset position of the aircraft can correspond to the offset position 430 and the second offset position of the navigation hazard can correspond to the offset position 432.

The method 1400 includes, at 1410, determining a plurality of candidate intersection points that together correspond to circular or spherical regions defined by the set of bounding relative position vectors and one or more speed ratios based on the first velocity data and the second velocity data. For example, the circular or spherical regions include or correspond to the Apollonius circles or Apollonius spheres described with references to FIGS. 6A-13B. As explained above, each Apollonius circle or Apollonius sphere is defined by candidate intersection points of the aircraft 160 and the navigation hazard 170.

The method 1400 includes, at 1412, identifying a region of interest based on a projected intersection of the aircraft with a candidate intersection point of the plurality of candidate intersection points or a projected intersection of the navigation hazard with the candidate intersection point. For example, the regions of interest can be determined based on intersections of one or more velocity vectors based on the first velocity data, one or more velocity vectors based on the second velocity data, or both. The method 1400 includes, at 1414, generating a situational awareness display based on the region of interest. For example, the situational awareness display corresponds to the display 150 of FIG. 1 and/or FIG. 2B.

In some implementations, the method 1400 also includes obtaining first velocity uncertainty data indicating uncertainty associated with the first velocity data and determining at least two speed ratios based on the first velocity data, the first velocity uncertainty data, and the second velocity data, where the plurality of candidate intersection points are determined based on the at least two speed ratios. For example, determining the at least two speed ratios can include determining, based on the first velocity uncertainty data and the first velocity data, a maximum first velocity and a minimum first velocity, determining a first speed ratio based on a magnitude of the maximum first velocity and a magnitude determined based on the second velocity data, and determining a second speed ratio based on a magnitude of the minimum first velocity and the magnitude determined based on the second velocity data.

In other implementations, a single speed ratio is determined based on the first velocity data, the first velocity uncertainty data, and the second velocity data. The plurality of candidate intersection points are then determined based on the single speed ratio. For example, when the first velocity uncertainty data is included in or indicated by heading or bearing uncertainty data, the method 1400 includes determining a single speed ratio.

In some implementations, determining the at least two speed ratios includes obtaining second velocity uncertainty data indicating uncertainty associated with the second velocity data, determining, based on the second velocity uncertainty data, a plurality of second direction boundaries for the second velocity data, and determining a set of bounding second velocities based on the plurality of second direction boundaries, where the magnitude determined based on the second velocity data corresponds to a magnitude of one of the set of bounding second velocities. For example, the set of bounding second velocities can include at least four angularly offset second velocities, where the at least four angularly offset second velocities correspond to a first horizontally offset second velocity that is angularly offset in a first horizontal direction from the second velocity, a second horizontally offset second velocity that is angularly offset in a second horizontal direction from the second velocity, a first vertically offset second velocity that is angularly offset in a first vertical direction from the second velocity, and a second vertically offset second velocity that is angularly offset in a second vertical direction from the second velocity. The first horizontal direction is opposite the second horizontal direction, and the first vertical direction is opposite the second vertical direction. The set of bounding second velocities can also, or in the alternative, include at least a maximum second velocity and a minimum second velocity.

In a particular implementation, the method 1400 includes determining a set of bounding first velocities based on the first velocity data and the first velocity uncertainty data. The set of bounding first velocities includes the maximum first velocity, the minimum first velocity, and at least four angularly offset first velocities. The at least four angularly offset first velocities correspond to a first horizontally offset first velocity that is angularly offset in a first horizontal direction from the first velocity, a second horizontally offset first velocity that is angularly offset in a second horizontal direction from the first velocity, a first vertically offset first velocity that is angularly offset in a first vertical direction from the first velocity, and a second vertically offset first velocity that is angularly offset in a second vertical direction from the first velocity. The first horizontal direction is opposite the second horizontal direction, and the first vertical direction is opposite the second vertical direction. In this implementation, determining the at least two speed ratios includes determining a plurality of speed ratios based on a plurality of vector pairs. Each vector pair of the plurality of vector pairs includes a first vector selected from the set of bounding first velocities and a second vector selected from the set of bounding second velocities.

In some implementations, the method 1400 includes obtaining second velocity uncertainty data indicating uncertainty associated with the second velocity data and determining at least two speed ratios based on the first velocity data, the second velocity data, and the second velocity uncertainty data. In such implementations, the plurality of candidate intersection points are determined based on the at least two speed ratios. The at least two speed ratios include determining, based on the second velocity uncertainty data and the second velocity data, a maximum second velocity and a minimum second velocity, determining a first speed ratio based on a magnitude of the maximum second velocity and a magnitude determined based on the first velocity data, and determining a second speed ratio based on a magnitude of the minimum second velocity and the magnitude determined based on the first velocity data.

In some such implementations, determining the at least two speed ratios includes obtaining first velocity uncertainty data indicating uncertainty associated with the first velocity data, determining, based on the first velocity uncertainty data, a plurality of first direction boundaries for the first velocity data, and determining a set of bounding first velocities based on the plurality of first direction boundaries. The magnitude is determined based on the first velocity data corresponds to a magnitude of one of the sets of bounding first velocities. In some implementations, the set of bounding first velocities includes at least four angularly offset first velocities. The at least four angularly offset first velocities corresponding to a first horizontally offset first velocity that is angularly offset in a first horizontal direction from the first velocity, a second horizontally offset first velocity that is angularly offset in a second horizontal direction from the first velocity, a first vertically offset first velocity that is angularly offset in a first vertical direction from the first velocity, and a second vertically offset first velocity that is angularly offset in a second vertical direction from the first velocity. The first horizontal direction is opposite the second horizontal direction, and the first vertical direction is opposite the second vertical direction. Alternatively, or in addition, the set of bounding first velocities includes a maximum first velocity and a minimum first velocity.

In some implementations, the method 1400 further includes determining a set of bounding second velocities based on the second velocity data and the second velocity uncertainty data. The set of bounding second velocities includes the maximum second velocity, the minimum second velocity, and at least four angularly offset second velocities. The at least four angularly offset second velocities correspond to a first horizontally offset second velocity that is angularly offset in a first horizontal direction from the second velocity, a second horizontally offset second velocity that is angularly offset in a second horizontal direction from the second velocity, a first vertically offset second velocity that is angularly offset in a first vertical direction from the second velocity, and a second vertically offset second velocity that is angularly offset in a second vertical direction from the second velocity. The first horizontal direction is opposite the second horizontal direction, and the first vertical direction is opposite the second vertical direction. In such implementations, determining the at least two speed ratios includes determining a plurality of speed ratios based on a plurality of vector pairs. Each vector pair of the plurality of vector pairs includes a first vector selected from the set of bounding first velocities and a second vector selected from the set of bounding second velocities.

Figure 15:
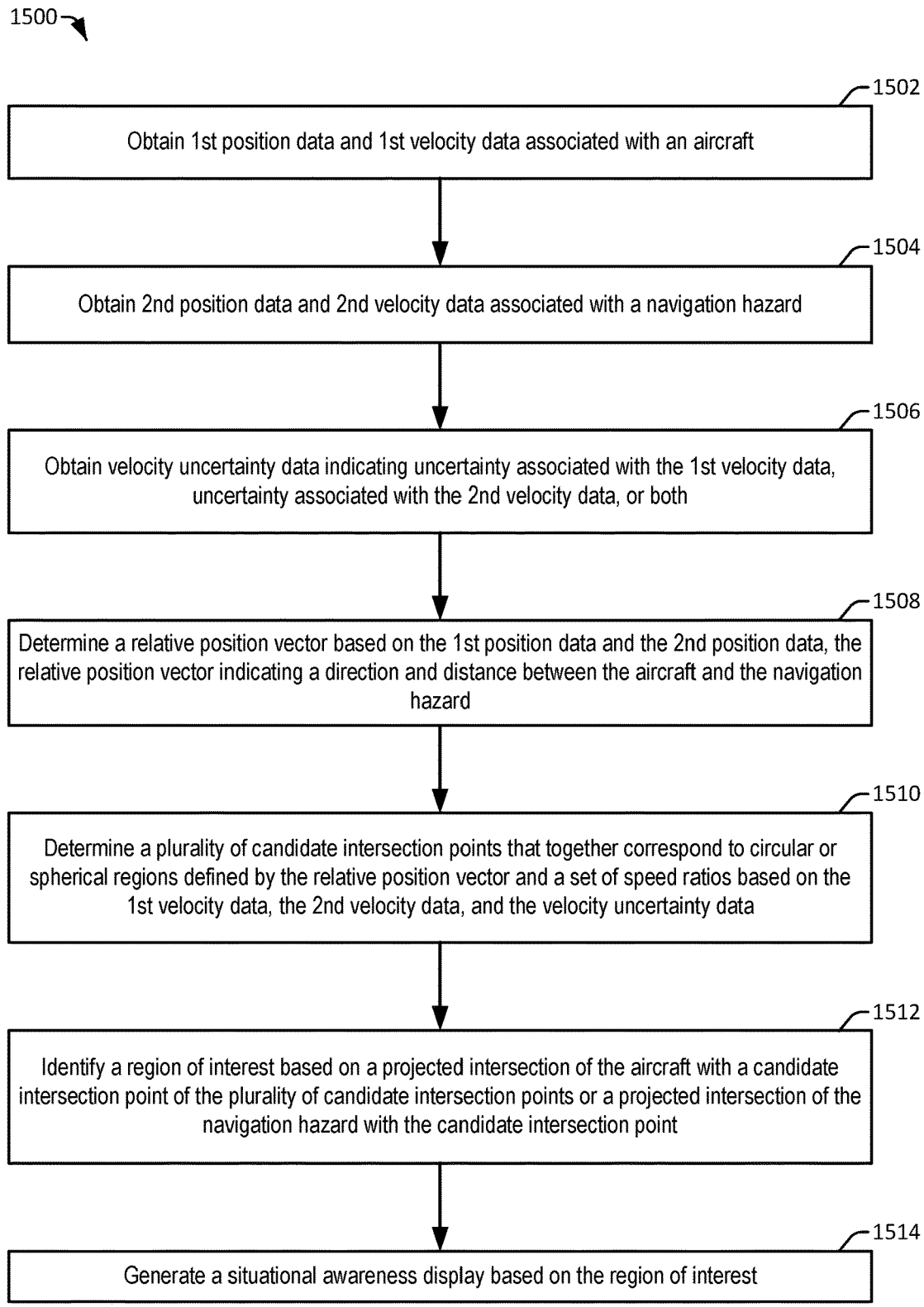
FIG. 15 is a flow chart that illustrates another example of a method of generating a situational awareness display.

FIG. 15 is a flow chart that illustrates an example of a method 1500 of generating a situational awareness display, such as the display 150 of one or more of FIG. 1 and FIG. 2B. The method 1500 can be performed by the aircraft flight information system 104 of FIG. 1. For example, the processor(s) 124 of the aircraft flight information system 104 can execute the instructions 132 to perform operations of the method 1500.

The method 1500 includes, at 1502, obtaining first position data and first velocity data associated with an aircraft, at 1504, obtaining second position data and second velocity data associated with a navigation hazard, and, at 1506, obtaining velocity uncertainty data indicating uncertainty associated with the first velocity data, uncertainty associated with the second velocity data, or both. The method 1500 also includes, at 1508, determining a relative position vector based on the first position data and the second position data. The relative position vector indicates a direction and distance between the aircraft and the navigation hazard.

The method 1500 also includes, at 1510, determining a plurality of candidate intersection points that together correspond to circular or spherical regions defined by the relative position vector and a set of speed ratios based on the first velocity data, the second velocity data, and the velocity uncertainty data. The method 1500 also includes, at 1512, identifying a region of interest based on a projected intersection of the aircraft with a candidate intersection point of the plurality of candidate intersection points or a projected intersection of the navigation hazard with the candidate intersection point, and, at 1514, generating a situational awareness display based on the region of interest.

In some implementations, the method 1500 also includes determining, based on the velocity uncertainty data and the first velocity data, a maximum first velocity and a minimum first velocity and determining, based on the velocity uncertainty data and the second velocity data, one or more second direction boundaries for the second velocity data. The method 1500 can further include determining one or more bounding second velocities based on the one or more second direction boundaries and magnitudes associated with the one or more second direction boundaries. In such implementations, the set of speed ratios can include a first set of speed ratios based on a magnitude of the maximum first velocity and a magnitude of each of the one or more bounding second velocities and a second set of speed ratios based on a magnitude of the minimum first velocity and the magnitude of each of the one or more bounding second velocities. Additionally, or in the alternative, the one or more bounding second velocities include a maximum second velocity and a minimum second velocity.

In some implementations, the one or more bounding second velocities include at least four angularly offset second velocities. The at least four angularly offset second velocities correspond to a first horizontally offset second velocity that is angularly offset in a first horizontal direction from the second velocity, a second horizontally offset second velocity that is angularly offset in a second horizontal direction from the second velocity, a first vertically offset second velocity that is angularly offset in a first vertical direction from the second velocity, and a second vertically offset second velocity that is angularly offset in a second vertical direction from the second velocity. The first horizontal direction is opposite the second horizontal direction, and the first vertical direction is opposite the second vertical direction.

In some implementations, the method 1500 includes determining, based on the velocity uncertainty data and the second velocity data, a maximum second velocity and a minimum second velocity and determining, based on the velocity uncertainty data, one or more first direction boundaries for the first velocity data. In such implementations, the method 1500 can include determining one or more bounding first velocities based on the one or more first direction boundaries and magnitudes associated with the one or more first direction boundaries. In such implementations, the set of speed ratios includes a third set of speed ratios based on a magnitude of the maximum second velocity and a magnitude of each of the one or more bounding first velocities and a fourth set of speed ratios based on a magnitude of the minimum second velocity and the magnitude of each of the one or more bounding first velocities. Additionally, or in the alternative, the one or more bounding first velocities include a maximum first velocity and a minimum first velocity.

In such implementations, the one or more bounding first velocities include at least four angularly offset first velocities. The at least four angularly offset first velocities correspond to a first horizontally offset first velocity that is angularly offset in a first horizontal direction from the first velocity, a second horizontally offset first velocity that is angularly offset in a second horizontal direction from the first velocity, a first vertically offset first velocity that is angularly offset in a first vertical direction from the first velocity, and a second vertically offset first velocity that is angularly offset in a second vertical direction from the first velocity. The first horizontal direction is opposite the second horizontal direction, and the first vertical direction is opposite the second vertical direction.

In some implementations, the method 1500 includes determining, at the processor, a set of bounding relative position vectors including the relative position vector. The set of bounding relative position vectors can be determined based on first position uncertainty data associated with the first position data, second position uncertainty data associated with the second position data, or both. In such implementations, the plurality of candidate intersection points are determined further based on the set of bounding relative position vectors.

In some such implementations, the first position uncertainty data indicates a first horizontal position uncertainty for a first position of the aircraft, a first vertical position uncertainty for the first position of the aircraft, or both, and the second position uncertainty data indicates a second horizontal position uncertainty for a second position of the navigation hazard, a second vertical position uncertainty for the second position of the navigation hazard, or both. The set of bounding relative position vectors can include at least a first relative position vector indicating a maximum distance between the aircraft and the navigation hazard. Additionally, or in the alternative, the set of bounding relative position vectors can include at least a second relative position vector indicating a vertical offset of the aircraft, in a first vertical direction, by a maximum value of the first position uncertainty data and a vertical offset of the navigation hazard, in a second vertical direction opposite the first vertical direction, by a maximum value of the second position uncertainty data.

Figure 16:
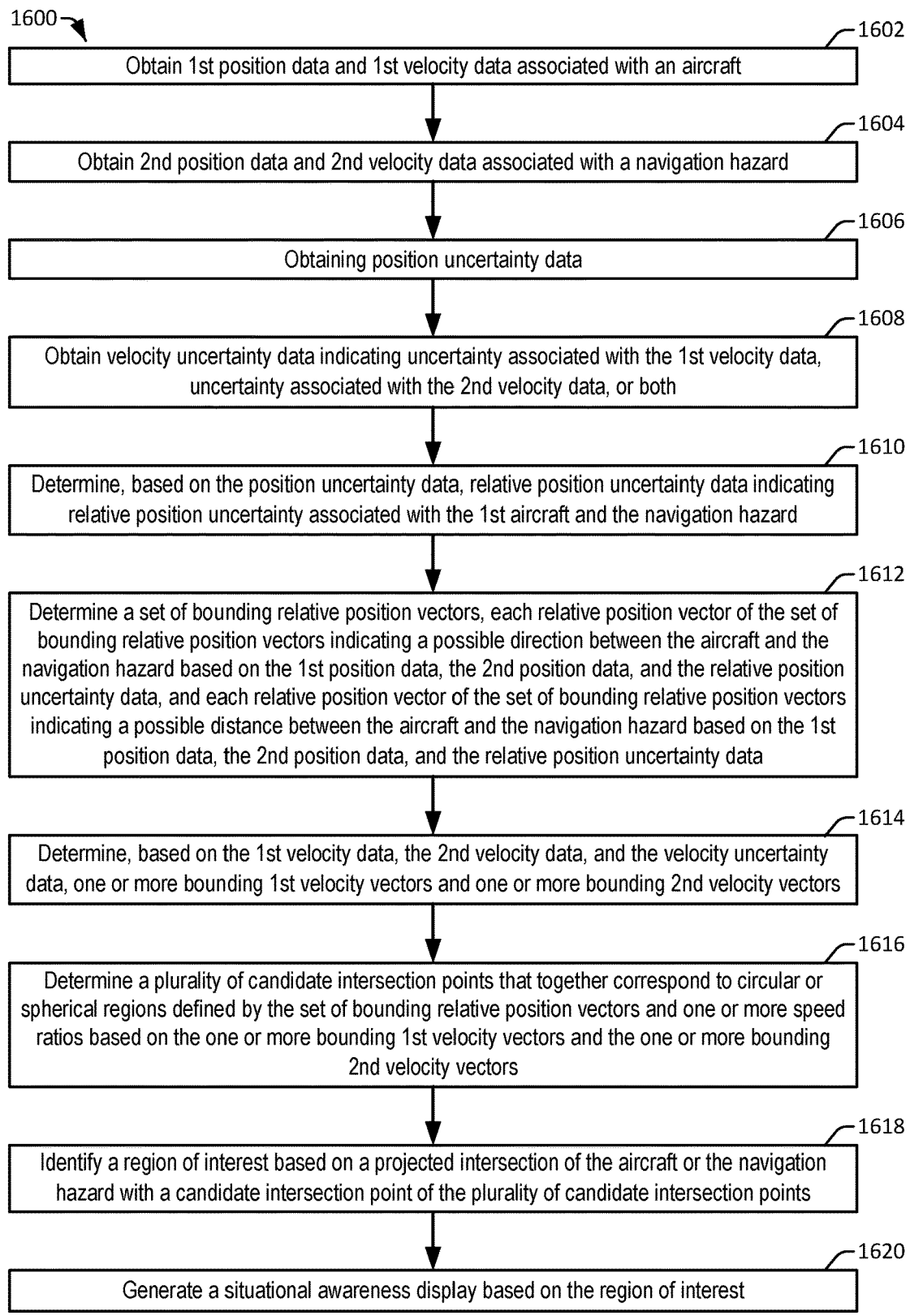
FIG. 16 is a flow chart that illustrates another example of a method of generating a situational awareness display.

FIG. 16 is a flow chart that illustrates an example of a method 1600 of generating a situational awareness display, such as the display 150 of one or more of FIG. 1 and FIG. 2B. The method 1600 can be performed by the aircraft flight information system 104 of FIG. 1. For example, the processor(s) 124 of the aircraft flight information system 104 can execute the instructions 132 to perform operations of the method 1600.

The method 1600 includes, at 1602, obtaining first position data and first velocity data associated with an aircraft and, at 1604, obtaining second position data and second velocity data associated with a navigation hazard. The method 1600 also includes, at 1606, obtaining position uncertainty data and, at 1608, obtaining velocity uncertainty data indicating uncertainty associated with the first velocity data, uncertainty associated with the second velocity data, or both.

The method 1600 includes, at 1610, determining, based on the position uncertainty data, relative position uncertainty data indicating relative position uncertainty associated with the aircraft and the navigation hazard. The method 1600 also includes, at 1612, determining a set of bounding relative position vectors. Each relative position vector of the set of bounding relative position vectors indicates a possible direction between the aircraft and the navigation hazard based on the first position data, the second position data, and the relative position uncertainty data. Each relative position vector of the set of bounding relative position vectors further indicates a possible distance between the aircraft and the navigation hazard based on the first position data, the second position data, and the relative position uncertainty data.

The method 1600 also includes, at 1614, determining, based on the first velocity data, the second velocity data, and the velocity uncertainty data, one or more bounding first velocity vectors and one or more bounding second velocity vectors. The method 1600 further includes, at 1616, determining a plurality of candidate intersection points that together correspond to circular or spherical regions defined by the set of bounding relative position vectors and one or more speed ratios based on the one or more bounding first velocity vectors and the one or more bounding second velocity vectors. The method 1600 also includes, at 1618, identifying a region of interest based on a projected intersection of the aircraft or the navigation hazard with a candidate intersection point of the plurality of candidate intersection points and, at 1620, generating a situational awareness display based on the region of interest.

Figure 17:
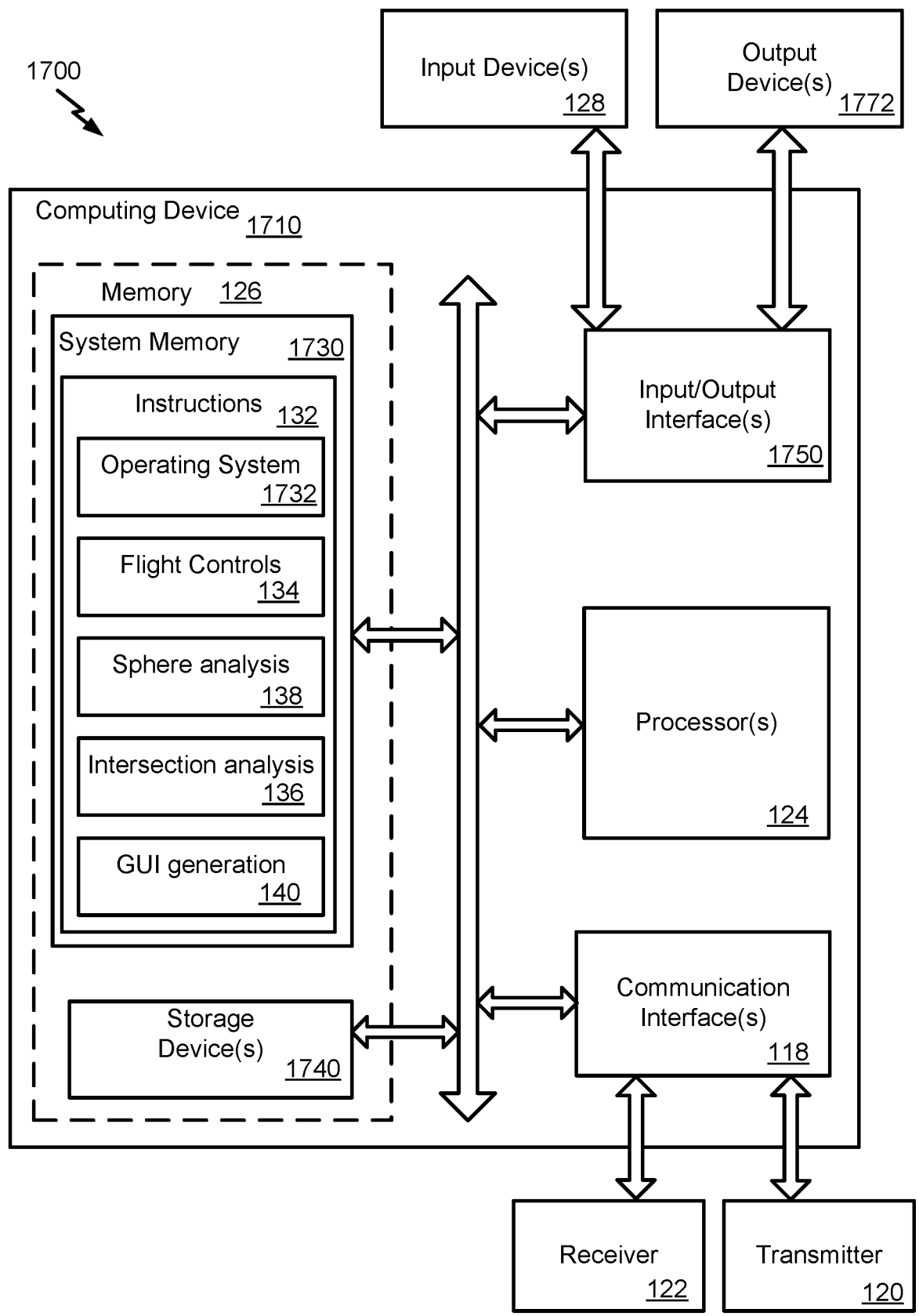
FIG. 17 is block diagram that illustrates an example of a computing environment including a computing device configured to perform operations of an aircraft flight information system.

FIG. 17 is block diagram that illustrates an example of a computing environment 1700 including a computing device 1710 that is configured to perform operations of an aircraft flight information system, such as the aircraft flight information system 104 of FIG. 1. The computing device 1710, or portions thereof, may execute instructions to perform or initiate the functions of the aircraft flight information system 104. For example, the computing device 1710, or portions thereof, may execute instructions according to any of the methods described herein, or to enable any of the methods described herein, such as the method 1400 of FIG. 14, the method 1500 of FIG. 15, or the method 1600 of FIG. 16.

The computing device 1710 includes the processor(s) 124. The processor(s) 124 can communicate with the memory 126, which can include, for example, a system memory 1730, one or more storage devices 1740, or both. The processor(s) 124 can also communicate with one or more input/output interfaces 1750 and the communication interface 118.

In a particular example, the memory 126, the system memory 1730, and the storage devices 1740 include tangible (e.g., non-transitory) computer-readable media. The storage devices 1740 include nonvolatile storage devices, such as magnetic disks, optical disks, or flash memory devices. The storage devices 1740 can include both removable and non-removable memory devices. The system memory 1730 includes volatile memory devices (e.g., random access memory (RAM) devices), nonvolatile memory devices (e.g., read-only memory (ROM) devices, programmable read-only memory, and flash memory), or both.

In FIG. 17, the system memory 1730 includes the instructions 132, which include an operating system 1732. The operating system 1732 includes a basic input/output system for booting the computing device 1710 as well as a full operating system to enable the computing device 1710 to interact with users, other programs, and other devices. The instructions 132 also includes one or more of the flight control instructions 134, the sphere analysis instructions 138, the intersection analysis instructions 136, or the GUI generation instructions 140 of FIG. 1.

The processor(s) 124 is coupled, e.g., via a bus, to the input/output interfaces 1750, and the input/output interfaces 1750 are coupled to the one or more input devices 128 and to one or more output devices 1772. The output device(s) 1772 can include, for example, the display device(s) 130 and the other output devices 156 of FIG. 1. The input/output interfaces 1750 can include serial interfaces (e.g., universal serial bus (USB) interfaces or Institute of Electrical and Electronics Engineers (IEEE) 1394 interfaces), parallel interfaces, display adapters, audio adapters, and other interfaces.

The processor(s) 124 are also coupled, e.g., via the bus, to the communication interface 118. The communication interface 118 includes one or more wired interfaces (e.g., Ethernet interfaces), one or more wireless interfaces that comply with an IEEE 802.11 communication protocol, other wireless interfaces, optical interfaces, or other network interfaces. In the example illustrated in FIG. 17, the communication interface 118 is coupled to the receiver 122 and to the transmitter 120. However, in other implementations, such as the example illustrated in FIG. 1, the receiver 122 and the transmitter 120 are components of or integrated within the communication interface 118.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

The invention claimed is:

1. A method comprising:
    obtaining, at a processor, first position data and first velocity data associated with an aircraft;
    obtaining, at the processor, second position data and second velocity data associated with a navigation hazard;
    obtaining, at the processor, position uncertainty data;
    determining, at the processor, a set of bounding relative position vectors, each relative position vector of the set of bounding relative position vectors indicating a possible direction between the aircraft and the navigation hazard based on the first position data, the second position data, and the position uncertainty data and each relative position vector of the set of bounding relative position vectors indicating a possible distance between the aircraft and the navigation hazard based on the first position data, the second position data, and the position uncertainty data;
    determining, at the processor, a plurality of candidate intersection points that together correspond to circular or spherical regions defined by the set of bounding relative position vectors and one or more speed ratios based on the first velocity data and the second velocity data;
    identifying a region of interest based on a projected intersection of the aircraft with a candidate intersection point of the plurality of candidate intersection points or a projected intersection of the navigation hazard with the candidate intersection point; and
    generating a situational awareness display based on the region of interest.

2. The method of claim 1, wherein the position uncertainty data includes first position uncertainty data indicating uncertainty in the first position data, second position uncertainty data indicating uncertainty in the second position data, or both.

3. The method of claim 1, wherein the position uncertainty data indicates a first horizontal position uncertainty for a first position of the aircraft and a second horizontal position uncertainty for a second position of the navigation hazard.

4. The method of claim 3, wherein the set of bounding relative position vectors includes at least:
    a first relative position vector indicating a first distance and a first direction between a first offset position of the aircraft and a first offset position of the navigation hazard,
        the first offset position of the aircraft corresponding to a horizontal offset from the first position, in a direction away from the second position, by a maximum value of the first horizontal position uncertainty, and
        the first offset position of the navigation hazard corresponding to a horizontal offset from the second position, in a direction away from the first position, by a maximum value of the second horizontal position uncertainty; and
    a second relative position vector indicating a second distance and a second direction between the first offset position of the aircraft and a second offset position of the navigation hazard, the second offset position of the navigation hazard corresponding to a horizontal offset from the second position, in a direction toward the first position, by a maximum value of the second horizontal position uncertainty.

5. The method of claim 4, wherein the relative position uncertainty data further indicates a first vertical position uncertainty for the first position of the aircraft and a second vertical position uncertainty for the second position of the navigation hazard.

6. The method of claim 5, wherein:
    the first offset position of the aircraft further corresponds to a vertical offset from the first position, in a first vertical direction, by a maximum value of the first vertical position uncertainty,
    the first offset position of the navigation hazard further corresponds to a vertical offset from the second position, in a second vertical direction opposite the first vertical direction, by a maximum value of the second vertical position uncertainty, the second offset position of the aircraft further corresponds to a vertical offset from the first position, in the first vertical direction, by the maximum value of the first vertical position uncertainty, and the second offset position of the navigation hazard further corresponds to a vertical offset from the second position, in the second vertical direction opposite the first vertical direction, by the maximum value of the second vertical position uncertainty.

7. The method of claim 4, wherein the first horizontal position uncertainty for the first position describes a first circular range of possible positions of the aircraft in a horizontal plane, wherein the second horizontal position uncertainty for the second position describes a second circular range of possible positions of the navigation hazard in the horizontal plane, and wherein the set of bounding relative position vectors includes at least a third relative position vector indicating a third distance and a third direction between a third offset position of the aircraft and a third offset position of the navigation hazard, the third offset position of the aircraft corresponding to a horizontal offset from the first position by the maximum value of the first horizontal position uncertainty, the third offset position of the navigation hazard corresponding to a horizontal from the second position by the maximum value of the second horizontal position uncertainty, and the third offset position of the aircraft and the third offset position of the navigation hazard positioned on a line that is tangent to a border of the first circular range of possible positions of the aircraft and is tangent to a border of the second circular range of possible positions of the navigation hazard.

8. The method of claim 7, wherein the relative position uncertainty data further indicates a first vertical position uncertainty for a first position of the aircraft and a second vertical position uncertainty for a second position of the navigation hazard, and wherein:

the third offset position of the aircraft further corresponds to a vertical offset from the first position, in a first vertical direction, by a maximum value of the first vertical position uncertainty, and the third offset position of the navigation hazard further corresponds to a vertical offset from the second position, in a second vertical direction opposite the first vertical direction, by a maximum value of the second vertical position uncertainty.

9. The method of claim 1, further comprising:

obtaining, at the processor, first velocity uncertainty data indicating uncertainty associated with the first velocity data; and determining at least two speed ratios based on the first velocity data, the first velocity uncertainty data, and the second velocity data, wherein the plurality of candidate intersection points are determined based on the at least two speed ratios, and wherein determining the at least two speed ratio includes:

determining, based on the first velocity uncertainty data and the first velocity data, a maximum first velocity and a minimum first velocity;

determining a first speed ratio based on a magnitude of the maximum first velocity and a magnitude determined based on the second velocity data; and determining a second speed ratio based on a magnitude of the minimum first velocity and the magnitude determined based on the second velocity data.

10. The method of claim 9, wherein determining the at least two speed ratios further includes:

obtaining, at the processor, second velocity uncertainty data indicating uncertainty associated with the second velocity data;

determining, based on the second velocity uncertainty data, a plurality of second direction boundaries for the second velocity data; and determining a set of bounding second velocities based on the plurality of second direction boundaries, wherein the magnitude determined based on the second velocity data corresponds to a magnitude of one of the set of bounding second velocities.

11. The method of claim 10, wherein the set of bounding second velocities includes at least four angularly offset second velocities, the at least four angularly offset second velocities corresponding to a first horizontally offset second velocity that is angularly offset in a first horizontal direction from the second velocity, a second horizontally offset second velocity that is angularly offset in a second horizontal direction from the second velocity, a first vertically offset second velocity that is angularly offset in a first vertical direction from the second velocity, and a second vertically offset second velocity that is angularly offset in a second vertical direction from the second velocity, wherein the first horizontal direction is opposite the second horizontal direction, and the first vertical direction is opposite the second vertical direction.

12. The method of claim 10, wherein the set of bounding second velocities includes at least a maximum second velocity and a minimum second velocity.

13. The method of claim 10, further comprising:

determining a set of bounding first velocities based on the first velocity data and the first velocity uncertainty data, the set of bounding first velocities including the maximum first velocity, the minimum first velocity, and at least four angularly offset first velocities, the at least four angularly offset first velocities corresponding to a first horizontally offset first velocity that is angularly offset in a first horizontal direction from the first velocity, a second horizontally offset first velocity that is angularly offset in a second horizontal direction from the first velocity, a first vertically offset first velocity that is angularly offset in a first vertical direction from the first velocity, and a second vertically offset first velocity that is angularly offset in a second vertical direction from the first velocity, wherein the first horizontal direction is opposite the second horizontal direction, and the first vertical direction is opposite the second vertical direction, wherein determining the at least two speed ratios further includes determining a plurality of speed ratios based on a plurality of vector pairs, each vector pair of the plurality of vector pairs including a first vector selected from the set of bounding first velocities and a second vector selected from the set of bounding second velocities.

14. The method of claim 1, further comprising:

obtaining, at the processor, second velocity uncertainty data indicating uncertainty associated with the second velocity data; and determining at least two speed ratios based on the first velocity data, the second velocity data, and the second velocity uncertainty data, wherein the plurality of candidate intersection points are determined based on the at least two speed ratios, and wherein determining the at least two speed ratios includes:
- determining, based on the second velocity uncertainty data and the second velocity data, a maximum second velocity and a minimum second velocity;
- determining a first speed ratio based on a magnitude of the maximum second velocity and a magnitude determined based on the first velocity data; and
- determining a second speed ratio based on a magnitude of the minimum second velocity and the magnitude determined based on the first velocity data.

15. The method of claim 14, wherein determining the at least two speed ratios further includes:
- obtaining, at the processor, first velocity uncertainty data indicating uncertainty associated with the first velocity data;
- determining, based on the first velocity uncertainty data, a plurality of first direction boundaries for the first velocity data; and
- determining a set of bounding first velocities based on the plurality of first direction boundaries, wherein the magnitude determined based on the first velocity data corresponds to a magnitude of one of the set of bounding first velocities.

16. The method of claim 15, wherein the set of bounding first velocities includes at least four angularly offset first velocities, the at least four angularly offset first velocities corresponding to a first horizontally offset first velocity that is angularly offset in a first horizontal direction from the first velocity, a second horizontally offset first velocity that is angularly offset in a second horizontal direction from the first velocity, a first vertically offset first velocity that is angularly offset in a first vertical direction from the first velocity, and a second vertically offset first velocity that is angularly offset in a second vertical direction from the first velocity, wherein the first horizontal direction is opposite the second horizontal direction, and the first vertical direction is opposite the second vertical direction.

17. The method of claim 15, wherein the set of bounding first velocities includes at least a maximum first velocity and a minimum first velocity.

18. The method of claim 15, further comprising:
- determining a set of bounding second velocities based on the second velocity data and the second velocity uncertainty data, the set of bounding second velocities including the maximum second velocity, the minimum second velocity, and at least four angularly offset second velocities, the at least four angularly offset second velocities corresponding to a first horizontally offset second velocity that is angularly offset in a first horizontal direction from the second velocity, a second horizontally offset second velocity that is angularly offset in a second horizontal direction from the second velocity, a first vertically offset second velocity that is angularly offset in a first vertical direction from the second velocity, and a second vertically offset second velocity that is angularly offset in a second vertical direction from the second velocity, wherein the first horizontal direction is opposite the second horizontal direction, and the first vertical direction is opposite the second vertical direction,
- wherein determining the at least two speed ratios further includes determining a plurality of speed ratios based on a plurality of vector pairs, each vector pair of the plurality of vector pairs including a first vector selected from the set of bounding first velocities and a second vector selected from the set of bounding second velocities.

19. The method of claim 1, wherein the relative position uncertainty data indicates a first vertical position uncertainty for a first position and a second vertical position uncertainty for a second position of the navigation hazard.

20. The method of claim 19, wherein the set of bounding relative position vectors includes a first relative position vector, the first relative position vector indicating a first distance and a first direction between a first offset position of the aircraft and a first offset position of the navigation hazard, wherein:
- the first offset position of the aircraft corresponds to a vertical offset from the first position, in a first vertical direction, by a maximum value of the first vertical position uncertainty, and
- the first offset position of the navigation hazard corresponds to a vertical offset from the second position, in a second vertical direction opposite the first vertical direction, by a maximum value of the second vertical position uncertainty.

21. The method of claim 20, wherein the set of bounding relative position vectors includes a second relative position vector, the second relative position vector indicating a second distance and a second direction between a second offset position of the aircraft and a second offset position of the navigation hazard, wherein:
- the second offset position of the aircraft corresponds to a vertical offset from the first position, in the second vertical direction, by a maximum value of the first vertical position uncertainty, and
- the second offset position of the navigation hazard corresponds to a vertical offset from the second position, in the first direction, by a maximum value of the second vertical position uncertainty.

22. A method comprising:
- obtaining, at a processor, first position data and first velocity data associated with an aircraft;
- obtaining, at the processor, second position data and second velocity data associated with a navigation hazard;
- obtaining, at the processor, position uncertainty data;
- obtaining, at the processor, velocity uncertainty data indicating uncertainty associated with the first velocity data, uncertainty associated with the second velocity data, or both;
- determining, at the processor based on the position uncertainty data, relative position uncertainty data indicating relative position uncertainty associated with the aircraft and the navigation hazard;
- determining, at the processor, a set of bounding relative position vectors, each relative position vector of the set of bounding relative position vectors indicating a possible direction between the aircraft and the navigation hazard based on the first position data, the second position data, and the relative position uncertainty data, and each relative position vector of the set of bounding relative position vectors indicating a possible distance between the aircraft and the navigation hazard based on the first position data, the second position data, and the relative position uncertainty data;
- determining, at the processor based on the first velocity data, the second velocity data, and the velocity uncertainty data, one or more bounding first velocity vectors and one or more bounding second velocity vectors;

determining, at the processor, a plurality of candidate intersection points that together correspond to circular or spherical regions defined by the set of bounding relative position vectors and one or more speed ratios based on the one or more bounding first velocity vectors and the one or more bounding second velocity vectors;

identifying a region of interest based on a projected intersection of the aircraft or the navigation hazard with a candidate intersection point of the plurality of candidate intersection points; and generating a situational awareness display based on the region of interest.

* * * * *